(12) United States Patent
Hatanaka

(10) Patent No.: US 8,049,783 B2
(45) Date of Patent: Nov. 1, 2011

(54) BLUR CORRECTION DEVICE, BLUR CORRECTION METHOD, ELECTRONIC APPARATUS INCLUDING BLUR CORRECTION DEVICE, IMAGE FILE AND IMAGE FILE CREATING APPARATUS

(75) Inventor: Haruo Hatanaka, Kyoto (JP)

(73) Assignee: SANYO Electric Co., Ltd., Moriguchi (JP)

( * ) Notice: Subject to any disclaimer, the term of this patent is extended or adjusted under 35 U.S.C. 154(b) by 606 days.

(21) Appl. No.: 12/105,692

(22) Filed: Apr. 18, 2008

(65) Prior Publication Data

US 2008/0259170 A1    Oct. 23, 2008

(30) Foreign Application Priority Data

Apr. 20, 2007    (JP) ................................ 2007-112209

(51) Int. Cl.
*H04N 5/228*    (2006.01)
(52) U.S. Cl. .............. 348/208.6; 348/231.2; 348/333.05
(58) Field of Classification Search .................. None
See application file for complete search history.

(56) References Cited

U.S. PATENT DOCUMENTS

| | | | |
|---|---|---|---|
| 6,876,393 B1* | 4/2005 | Yokonuma | 348/372 |
| 2003/0193602 A1* | 10/2003 | Satoh et al. | 348/333.12 |
| 2004/0257462 A1* | 12/2004 | Goris et al. | 348/372 |
| 2005/0062878 A1* | 3/2005 | Ogawa et al. | 348/372 |
| 2005/0088460 A1* | 4/2005 | Ouchi et al. | 345/672 |
| 2006/0110147 A1* | 5/2006 | Tomita et al. | 396/55 |
| 2006/0227221 A1* | 10/2006 | Okubo | 348/208.2 |
| 2007/0182981 A1* | 8/2007 | Aiso | 358/1.14 |

FOREIGN PATENT DOCUMENTS

| | | | |
|---|---|---|---|
| EP | 1139205 A1 | * | 10/2001 |
| JP | 2006-129236 | | 5/2006 |
| JP | 2006129302 A | * | 5/2006 |

* cited by examiner

Primary Examiner — Lin Ye
Assistant Examiner — Dennis Hogue
(74) Attorney, Agent, or Firm — NDQM & Watchstone LLP

(57) ABSTRACT

Image files are rearranged according to the blurring amount obtained from each of blurring information pieces of the image files and displayed as thumbnail images. After several image files are selected from the displayed image files, the image information pieces of the selected image files are sequentially corrected.

11 Claims, 24 Drawing Sheets

FIG. 7A

| h(−1,1) | h(0,1) | h(1,1) |
| --- | --- | --- |
| h(−1,0) | h(0,0) | h(1,0) |
| h(−1,−1) | h(0,−1) | h(1,−1) |

FIG. 7B

| p(i−1, j+1) | p(i, j+1) | p(i+1, j+1) |
| --- | --- | --- |
| p(i−1, j) | p(i, j) (TARGET PIXEL) | p(i+1, j) |
| p(i−1, j−1) | p(i, j−1) | p(i+1, j−1) |

CALCULATION OF IMAGE RESTORATION FILTER

CORRECTION OF IMAGE FILE

BLUR CORRECTION DEVICE, BLUR CORRECTION METHOD, ELECTRONIC APPARATUS INCLUDING BLUR CORRECTION DEVICE, IMAGE FILE AND IMAGE FILE CREATING APPARATUS

Applicant claims, under 35 U.S.C. .sctn. 119, the benefit of priority of the filing date of Apr. 20, 2007, of a Japanese Patent Application No. P 2007-112209, filed on the aforementioned date, the entire contents of which are incorporated herein by reference.

BACKGROUND OF THE INVENTION

1. Field of the Invention

The present invention relates to a blur correction device installed in an electronic apparatus typified by an image pickup apparatus such as a digital camera and an image output apparatus such as a display and a printer, a blur correction method thereof, and an electronic apparatus including the blur correction device. Moreover, the present invention also relates to an image file used in the electronic apparatus and an image file creating apparatus configured to create such an image file.

2. Description of the Related Art

Image information piece created with an image pickup apparatus such as a digital camera sometimes suffers from image degradation due to a shake of the image pickup apparatus during its exposure period. In many cases, an image pickup apparatus is shaken by user's hands movement, that is, by the jiggling of user's hands supporting the image pickup apparatus during the exposure period. Even if a user picks up images with the utmost care, such an apparatus shake is difficult to prevent completely.

For this reason, blur correction processing has been heretofore carried out to obtain a clear image. In the blur correction processing, an apparatus shake itself is reduced when the shake occurs during an exposure period, and degradation of an image caused by the apparatus shake is corrected after the image is picked up. Examples of this blur correction processing method include an optical correction method and an electronic correction method. With the optical correction method, a shake of an image pickup apparatus is cancelled out with an optical system such as a lens and an image pickup element driven in a direction of offsetting the shake while shake detection sensors such as an angular velocity sensor and an acceleration sensor are detecting the shake of the image pickup apparatus. In contrast, with the electronic correction method, a picked-up image information piece is analyzed to figure out blur components generated during the exposure period, and then the image information piece is corrected by use of the figured-out blur components.

In the case of using the optical correction method, however, a complicated and large blur correction device for driving an optical system needs to be mounted in an image pickup apparatus since correction must be carried out during shooting. In addition, an image pickup apparatus using the optical correction method requires high power consumption for driving an optical system and accordingly suffers from a problem of heavy battery consumption.

In contrast, in the case of the electronic correction method, a configuration of an image pickup apparatus can be simplified and downsized, and the correction processing can be carried out even in a printer or a display that does not perform an image pickup operation. This is possible because the correction processing can be performed on an image after the shooting. However, the electronic correction method has problems that it takes long time to analyze and process an image information piece, and that it is so difficult to analyze proper blur components in an image information piece that the image information piece may not be corrected sufficiently.

With this regard, in order to solve this problem, the inventors of the present application have proposed a blur correction device using an image restoration-based correction method (see Japanese Patent Application Publication NO. 2006-129236). In this blur correction device, a camera shake sensor measures an angular velocity or the like of a camera during the shooting to obtain a camera shake signal, and the image information piece is corrected based on this camera shake signal after the shooting.

Use of this image restoration-based correction method allows the configuration of an image pickup apparatus including a blur correction device to be simpler and more downsized than that using the optical correction method. In addition, the use of the image restoration-based correction method can achieve high improvement in the quality of corrected image information piece and allow a blur correction device to perform the correction operation at high speed in comparison with the case of using the electronic correction method.

SUMMARY OF THE INVENTION

A blur correction device of the present invention is configured to obtain a plurality of image files each including an image information piece and a blurring information piece that indicates blurring contained in the image information piece. The blur correction device includes: a correction unit configured to generate a corrected image file by correcting the image information piece on the basis of the blurring information piece; a rearranging unit configured to obtain the blurring amount from the blurring information piece, the blurring amount indicating the intensity of the blurring, and to rearrange the plurality of image files according to the blurring amount; and an image file selector configured to select specific image files from among the plurality of image files rearranged by the rearranging unit. In the blur correction device, the correction unit generates corrected image files corresponding to each of the specific image files selected by the image file selector, by correcting the image information piece on the basis of the blurring information piece, the image and blurring information pieces being included in the each of the specific image files.

Moreover, the blur correction device having the above configuration may further include a display unit configured to display images of the plurality of image files. The display unit may display the respective images of the plurality of image files in the order in which the plurality of image files are rearranged by the rearranging unit.

Additionally, in the blur correction device having the above configuration, the images of the plurality of image files each having the blurring amount exceeding a predetermined value may be displayed on the display unit, and the image file selector may select the image files from among the plurality of image files.

With this configuration, the image files that each have such a small blurring amount as not to be corrected are neither displayed on the display unit, nor selected by the image file selector. Thus, a user can easily select image files each having such a large blurring amount enough as to need correcting.

In addition, the blur correction device having the above configuration may be configured to display on the display unit both the image of an image file stored in a storage unit, and the image of the corrected image file, or to display only one of the two images on the display unit.

The blur correction device having the above configuration may further include: a storage unit configured to store the image files and the corrected image files corresponding to each of the specific image files; and a controller configured to control the storage unit. In response to an instruction to delete any one file of a pair of one specific image file included in the specific image files and one corrected image file corresponding to the one specific image file, the controller may delete both the designated file and the other file in the pair without receiving an instruction to delete the other file.

This configuration can prevent a situation in which, when any one of a pair of an image file and a corrected image file is deleted from the storage unit, the other file is kept stored in the storage unit with its presence forgotten by a user.

The blur correction device having the above configuration may further include a correction time estimation unit configured to estimate a correction time on the basis of each of blurring information pieces corresponding to each of image information pieces that need correcting but are yet to be corrected, when the correction unit sequentially corrects the image information pieces included in each of the specific image files, the correction time indicating a time required until the correction unit completes the correction operation.

This configuration allows the blur correction device to estimate the time required to complete the correction, and then to display the estimated time on the display unit. Accordingly, even when a long correction time is required to correct a large number of image information pieces, this display of the correction time can reduce the stress imposed on the user.

The blur correction device having the above configuration may further include: a power supply configured to drive the blur correction device by use of electric power charged therein; a detector configured to detect the amount of electric power charged in the power supply; and a correction power consumption estimation unit configured to estimate the amount of power consumption when the correction unit sequentially corrects the image information pieces included in the respective specific image files. Here, the amount of power consumption indicates the amount of electric power required until the correction unit completes the correction operation. The correction power consumption estimation unit may estimate the amount of power consumption on the basis of the correction time estimated by the correction time estimation unit.

Moreover, the blur correction device having the above configuration may be configured to determine whether to terminate the operation of the correction unit by comparing the estimated amount of power consumption and the amount of electric power detected by the detector, or to determine whether to terminate the operation of the correction unit by comparing a predetermined value and the amount of electric power detected by the detector.

This configuration can prevent the electric power held in the power supply form being exhausted during the correction operation, thereby avoiding image file corruption. In addition, similarly, this prevents the user from failing to know how many image files have been already corrected.

Another blur correction device of the present invention is configured to obtain a plurality of image files each including an image information piece and a blurring information piece that indicates blurring contained in the image information piece. The blur correction device includes: a correction unit configured to generate a corrected image file by correcting the image information piece on the basis of the blurring information piece; a correction time estimation unit configured to estimate a correction time on the basis of the blurring information pieces corresponding to the image information pieces, the correction time indicating a time required until the correction unit completes the correction operation for the image information pieces; a power supply configured to drive the blur correction device by use of electric power charged therein; a detector configured to detect the amount of electric power charged in the power supply; a correction power consumption estimation unit configured to estimate the amount of power consumption on the basis of the correction time estimated by the correction time estimation unit, the amount of power consumption indicating the amount of electric power required until the correction unit completes the operation.

This blur correction device having the above configuration may use a motion vector as the blurring information piece. Moreover, the blur correction device may use not only the motion vector but also a point spread function (PSF) or an image restoration filter as the blurring information piece.

This configuration enables a blurring information piece to be added to an image file. This blurring information piece is obtained by the conversion from a camera shake signal that is directly obtained from a sensor such as an angular velocity sensor. Then, the blurring information piece is directly used to generate an image restoration filter. In this case, a time required to generate the image restoration filter can be reduced as compared with the case where the image restoration filter is generated from the camera shake signal. Moreover, the data amount of an image file can also be reduced in comparison with the case of adding the cameral shake signal to the image file.

In addition, an electronic apparatus of the present invention is configured to obtain an image information piece by receiving external input or by imaging, and to have a function of correcting the image information piece on the basis of a blurring information piece that indicates blurring contained in the image information piece. As a correction processor that implements the correction function, the electronic apparatus includes one of the above blur correction devices. In the electronic apparatus, the blur correction device corrects the image information piece to generate a desired corrected image file.

The electronic apparatus having the above configuration may further include: an imager configured to generate the image information piece by performing an image pickup operation; a sensor configured to detect a movement of the electronic apparatus caused during the image pickup operation and to generate a camera shake signal; a blurring information generator configured to generate the blurring information piece from the camera shake signal obtained from the sensor; and an image file generator configured to generate the image file composed of the image information piece and the blurring information piece.

In addition, a blur correction method includes: a first step of obtaining a plurality of image files each including an image information piece and a blurring information piece that indicates blurring contained in the image information piece, of obtaining a blurring amount from the blurring information piece, the blurring amount indicating the intensity of the blurring, and of rearranging the plurality of image files according to the blurring amount; a second step of selecting specific image files from the plurality of image files rearranged in the first step; and a third step of correcting the image information piece on the basis of the blurring information piece, the image and blurring information pieces being included in the each of the specific image files.

The blur correction method may further include a fourth step of displaying the images of the image files rearranged in the first step. After the images are displayed in the fourth step, the specific image files are selected from the plurality of image files in the second step.

Furthermore, an image file of the present invention may include: an image information piece generated by an image pickup operation of an image pickup apparatus; and a blurring information piece generated on the basis of a camera shake signal that is obtained by detection of a shake of the electronic apparatus caused during the image pickup operation. In addition, an image file generator of the present invention may be configured to generate an image file including: an image information piece generated by an image pickup operation of an image pickup apparatus; and a blurring information piece generated on the basis of a camera shake signal that is obtained by detection of a shake of the image pickup apparatus caused during the image pickup operation.

BRIEF DESCRIPTION OF THE DRAWINGS

FIGS. 7A to 7C are schematic diagrams of an image restoration filter and pixels in an image information piece.

DESCRIPTION OF THE PREFERRED EMBODIMENT

Figure 1:
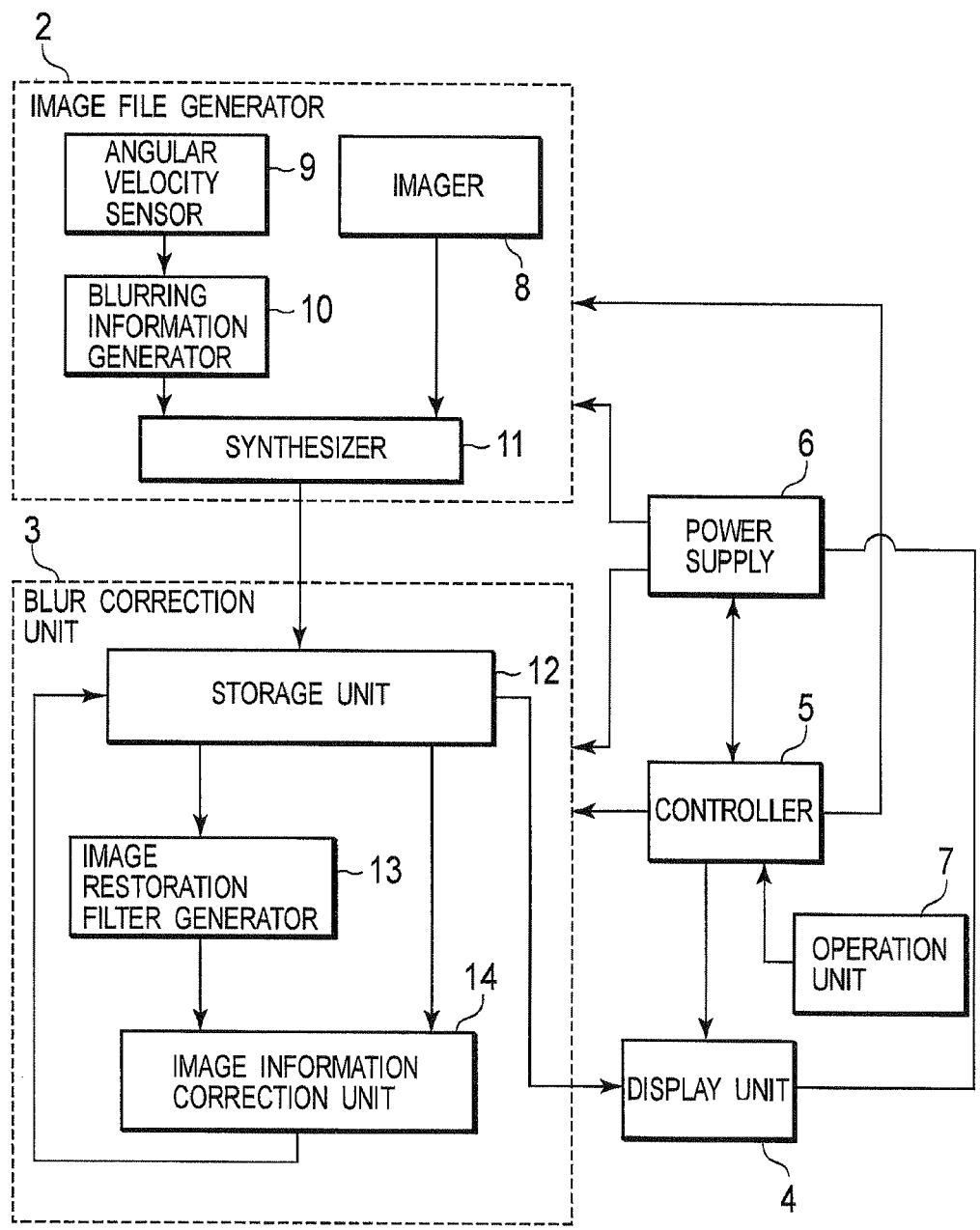
FIG. 1 is a block diagram of an image pickup apparatus according to an embodiment of the present invention.

Hereinafter, an embodiment of the present invention will be described in detail with reference to drawings. It should be noted that the embodiment to be described below is merely an embodiment of the present invention, so that the definition of the term of each constituent element is not limited to one described in the following embodiment. In each of the drawings to be referred, same or similar reference numerals are given to denote same or similar portions, and basically, an overlapping description of the same portion is omitted herein.

<Configuration of Image Pickup Apparatus>

To begin with, a schematic configuration of an electronic apparatus including a blur correction device according to an embodiment of the present invention will be described by taking an image pickup apparatus as an example and by using a block diagram of an image pickup apparatus in FIG. 1.

As shown in FIG. 1, an image pickup apparatus 1 according to this embodiment of the present invention includes: an image file generator 2 configured to pickup an image and to generate an image file; a blur correction unit 3 configured to correct an image file obtained from the image file generator 2; a display unit 4 configured to display the image of an image file regardless of whether the image file is corrected or not; a power supply 6 configured to supply power to the image file generator 2, the blur correction unit 3, the display unit 4 and a controller 5; the controller 5 configured to control the whole operations of the image pickup apparatus 1 and to check the remaining battery power that the power supply 6 can supply; and an operation unit 7 configured to input an instruction of a user to the controller 5.

In addition, the image file generator 2 includes: an imager 8 configured to pickup an image; an angular velocity sensor 9 configured to operate in synchronization with an shooting operation of the image pickup apparatus 1 and to detect an angular velocity of a shake of the image pickup apparatus 1 during the shooting operation; a blurring information generator 10 configured to generate a blurring information piece by converting a camera shake signal obtained from the angular velocity sensor 9; and a synthesizer 11 configured to generate an image file by combining a blurring information piece obtained from the blurring information generator 10 and an image information piece obtained from the imager 8.

Moreover, the blur correction unit 3 includes: a storage unit 12 configured to store the image file; an image restoration filter generator 13 configured to generate an image restoration filter from the blurring information piece; and an image information correction unit 14 configured to correct the image information piece by using the image restoration filter and to store the image file obtained after the correction (hereinafter, such an image file is referred to as a corrected image file) in the storage unit 12.

Here, an outline of operations of the image pickup apparatus 1 is described by using FIG. 1. Once an instruction to pick up an image is inputted to the operation unit 7, the controller 5 instructs the image file generator 2 to generate an image file. In response to this instruction, the imager 8 and the angular velocity sensor 9 start operating to pick up an image for a designated time period. Thus, the imager 8 generates the image information piece, and at the same time, the blurring information generator 10 receives a camera shake signal obtained from the angular velocity sensor 9 and generates the blurring information piece by converting the received camera shake signal Upon generation of the blurring information piece, the synthesizer 11 generates the image file by adding the blurring information piece to the image information piece obtained from the imager 8. In this case, the image file is configured by including the blurring information piece in the header information of the image file, for example. Then, the image file is stored in the storage 12 in the blur correction unit 3, and concurrently the image of the image file is displayed on the display unit 4 in response to a user's instruction to display the image.

Then, when the user selects an image file and inputs an instruction to correct the image file to the operation unit 7, the controller 5 operates the blur correction unit 3 to make correction. At this time, either one or several image files may be selected for correction. A series of this correction processing of selecting and correcting one or several image files will be described in detail later.

Once the correction operation starts, the blurring information piece of a selected image file stored in the storage unit 12 is inputted to the image restoration filter generator 13, and then the image restoration filter is generated and read to the image information correction unit 14. Similarly, the image information piece of the selected image file is read to the image information correction unit 14, and corrected by using the image restoration filter. Thus, the corrected image file is generated. The generated corrected image file is stored in the storage unit 12 and displayed on the display unit 4 in response to a user's instruction.

As a result, in addition to the original image file before the correction, the corrected image file is stored in the storage unit 12. Hence, the storage unit 12 has the two kinds of image files before and after the correction in a mixed manner. The two kinds of image files can be distinguished by naming the image files. For example, suppose a case where image files are each managed by use of a file name with an extension. The file name includes 8 characters, including 4 alphabet characters and 4 numbers. In this case, a name such as "ORGN0017" is given to an original image file, i.e., an image file inputted from the synthesizer 11, while a name such as "STAB0017" is given to a corrected image file, i.e., an image file generated by and inputted from the image information correction unit 14 to the storage unit 12.

Thus, the first half 4 alphabet characters of the file name are used to determine whether the image file is a corrected image file or not, while the last half 4 numbers thereof are used to determine whether the two files represent the same image. Moreover, display of images can be controlled by changing the extensions of image files in reference to their names. Specifically, the extensions of two image files before and after correction are changed as needed either to display the image of only one of the two image files while deleting the image of the other image file from view, or to display both images of the two image files. For example, here, the extension of an image file to be displayed is defined as JPG, and the extension of an image file not to be displayed is defined as TMP. In this case, only image files with JPG are displayed. The following description will be provided based on the assumption that image files are given names and extensions as in the above example. The display operation, however, will be described in detail later.

The controller 5 determines whether the power supply 6 can supply sufficient power for the foregoing operations such as generation and correction of an original image file. For example, when the power supply 6 is a battery or like, the controller 5 checks the amount of power stored in the power supply 6. If the amount of power is too small to generate a corrected image file or to continue the correction operation, the controller 5 warns a user or terminates the operation to avoid image file corruption.

Incidentally, although FIG. 1 shows electronic apparatuses of the present invention as the image pickup apparatus 1 including the image file generator 2 such as a digital camera, the electronic apparatuses of the present invention may not be equipped with any image file generator 2 such as a display or printer. In this case, the image pickup apparatus 1 is configured to have an image file inputted thereto from the outside, and to store the image file in the storage unit 12 in the blur correction unit 3. Moreover, the electronic apparatuses of the present invention may be configured without being equipped with the display unit 4. An example of such electronic apparatus is an apparatus or the like that corrects an inputted image file and inputs the corrected image file to another image output apparatus.

In a case where an electronic apparatus of the present invention is one operating by use of a power supply 6, such as a commercial power supply, which endlessly supplies power, there is no need to check a remaining battery power of the power supply 6. For this reason, the controller 5 may be configured not to check the remaining battery power of the power supply 6. In addition, even though the electronic apparatus is one using the power supply 6 such as a battery whose remaining battery power needs to be checked, the electronic apparatus sometimes operates by receiving power supply from a commercial power supply or the like. On that occasion, the controller 5 may be set not to check the remaining battery power of the power supply 6 because the battery remaining battery power does not need to be checked.

Any type of information such as a motion vector, a point spread function (hereinafter, abbreviated as PSF) and an image restoration filter may be used as the blurring information piece generated by the blurring information generator 10. Moreover, the compressed blurring information piece may be included in an image file. If the blurring information piece is the image restoration filter, the blur correction unit 3 may be configured without being equipped with the image restoration filter generator 13.

<Image Restoration-Based Correction Method>

Hereinafter, description will be provided for an example in which the image restoration-based correction method is applied to an image pickup apparatus configured to perform blur correction according to this embodiment of the present invention, and is applied to its blur correction method. In this image restoration-based correction method, firstly, [1] camera shake signals are detected from shakes of the image pickup apparatus during shooting, and a motion vector representing a shake locus during the shooting is obtained from the camera shake signals. Secondly, [2] a PSF to determine weighting for correction is obtained from the motion vector. Thirdly, [3] an image restoration filter to correct an image information piece is obtained by converting the PSF. Thereafter, [4] the correction processing is performed on the image information piece by carrying out a multiply-accumulate operation for each pixel of the image information piece by use of this image restoration filter. Hereinafter, the processing methods [1] to [4] will be described one by one.

[1] Camera Shake Signal/Motion Vector Conversion Processing

Figure 2:
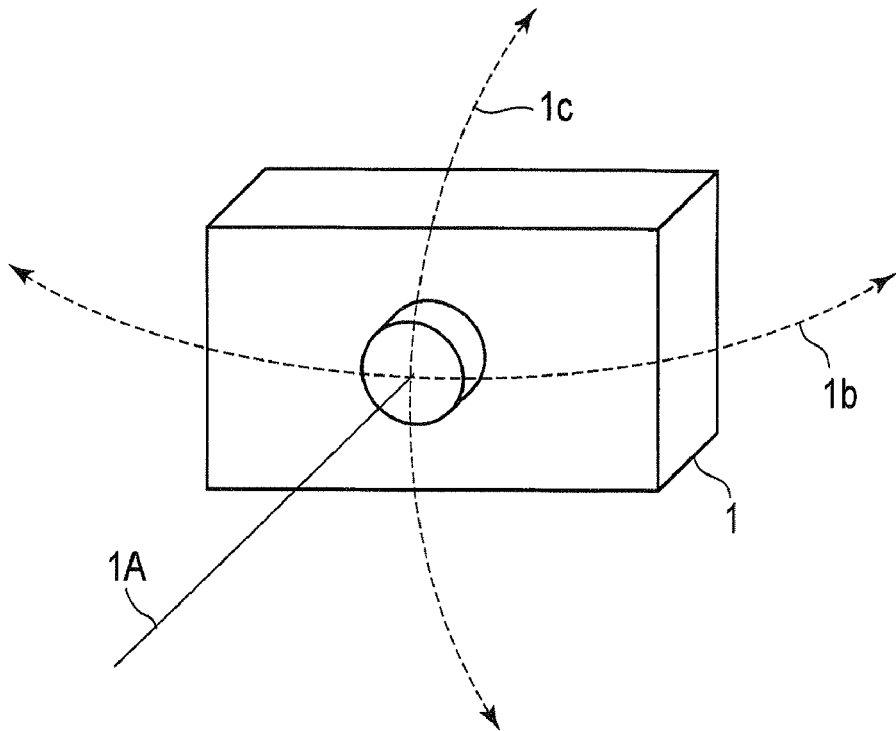
FIG. 2 is a perspective schematic view showing the image pickup apparatus.

In the first place, a method of detecting a camera shake signal is described by using FIG. 2. FIG. 2 is a perspective view schematically showing the image pickup apparatus 1. If an object of shooting is located sufficiently far from the image pickup apparatus 1, a camera shake is mainly caused by a rotation of the image pickup apparatus 1. More precisely, as shown in FIG. 2, an image has horizontal blurring when an optical axis 1a of the image pickup apparatus 1 rotates in panning directions 1b, and has vertical burring when the optical axis 1a rotates in tilt directions 1c. Burring can be expressed by use of the above two kinds of burring. In this embodiment, an angular velocity is used to express how the optical axis 1a of the image pickup apparatus 1 is shaken during shooting, and accordingly the camera shake signal is formed of this angular velocity.

The camera shake signals are obtained by detecting angular velocities of the optical axis 1a rotating in both of the panning directions 1b and the tilt directions 1c for a period from start to finish of shooting. More specifically, the angular velocities are detected at predetermined sampling intervals dt (for example, 1 msec) by means of angular velocity sensors (for example, gyroscopes) respectively corresponding to the panning directions 1b and the tilt directions 1c. The same method of detecting angular velocities and the same method of converting camera shake signals to a motion vector are used to correct the blurring in both the panning directions 1b and the tilt directions 1c. For this reason, hereinafter, description will be provided only for the methods for the panning directions 1b and the description for the tilt directions 1c will be omitted.

Figure 3:
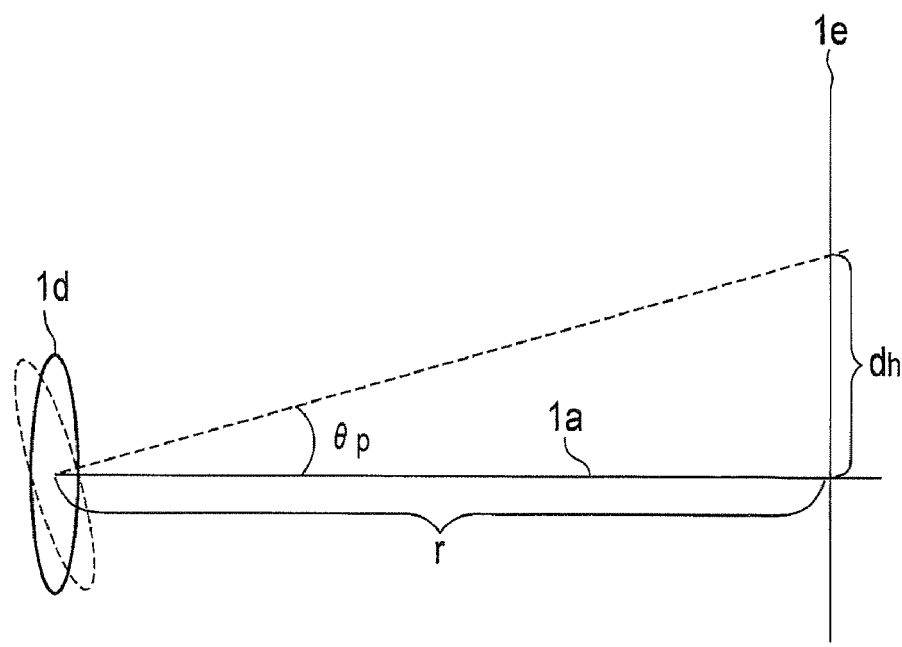
FIG. 3 is a schematic diagram showing a relationship between a rotation of the image pickup apparatus in the panning direction and an amount of horizontal movement on an image.
Figure 4:
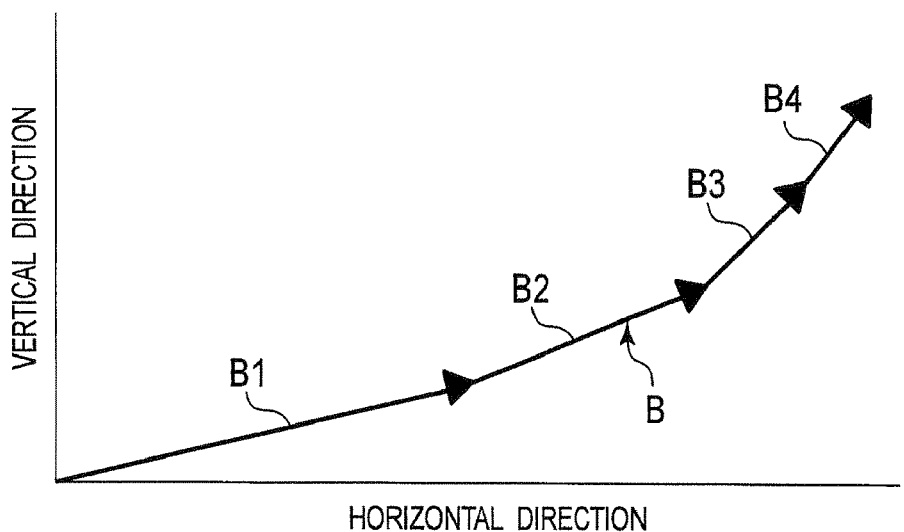
FIG. 4 is a schematic diagram of a motion vector.

Next, the method of converting the camera shake signals detected by the angular velocity sensors into a motion vector will be described by using FIGS. 3 and 4. FIG. 3 is a schematic diagram showing a relationship between a rotation of the image pickup apparatus in the panning direction and an amount of horizontal movement on an image. FIG. 4 is a schematic diagram of a motion vector. In FIG. 3, a lens and the optical axis rotated by a camera shake are shown with broken lines.

The angular velocity sensor for the panning directions detects an angular velocity $\theta_{p1}$ for a certain sampling period. Assuming that this angular velocity is constant for this sampling period, a rotating amount $\theta_p$ is figured out from an equation of a rotating amount $\theta_p = \theta_{p1} \times dt$ where dt denotes the sampling period. Then, as shown in FIG. 3, a horizontal moving amount $d_h$ is calculated from $d_h = r \tan \theta_p$ based on the rotating amount $\theta_p$ with a focal distance r that is the distance between a lens 1d and an image pickup element 1e. In addition, in the same manner, a vertical moving amount $d_v$ is obtained based on an angular velocity et of the tilt direction.

Here, if the focal distance r is set as a value based on 35 mm film conversion, the obtained moving amounts $d_h$ and $d_v$ need to be converted according to the size of image information piece. The size of a 35 mm film is 36×24 (mm) and the size of image information piece of a digital camera is assumed as X×Y on a pixel basis. To implement the conversion, the moving amount $d_h$ may be multiplied by X/36 and the moving amount $d_v$ may be multiplied by Y/24. Then, the moving amounts obtained after conversion are expressed as $(d_{ph}, d_{pv})$.

A vector having these two elements $(d_{ph}, d_{pv})$ is a camera shake locus for a certain sampling period. When the vectors for all the sampling periods are connected in time series, the connected vectors represent a camera shake locus for the entire shooting period. Such connected vectors are called a motion vector.

FIG. 4 shows an example of the motion vector. In FIG. 4, the size of each of vectors B1 to B4 represents a velocity of shake for the corresponding sampling period, and the direction of each of the vectors B1 to B4 represents a direction of the shake. The number of the vectors B1 to B4 represents the number of sampling times. FIG. 4 shows a motion vector B for an example in which the angular velocity are sampled four times during shooting.

[2] Motion Vector/PSF Conversion Processing

Figure 5:
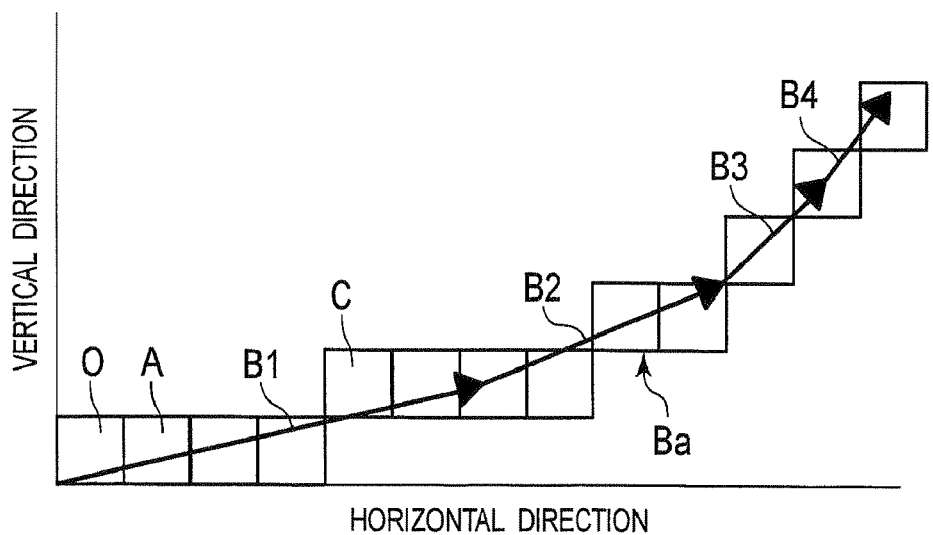
FIG. 5 is a graph in which the motion vector is expressed by integer values.
Figure 6:
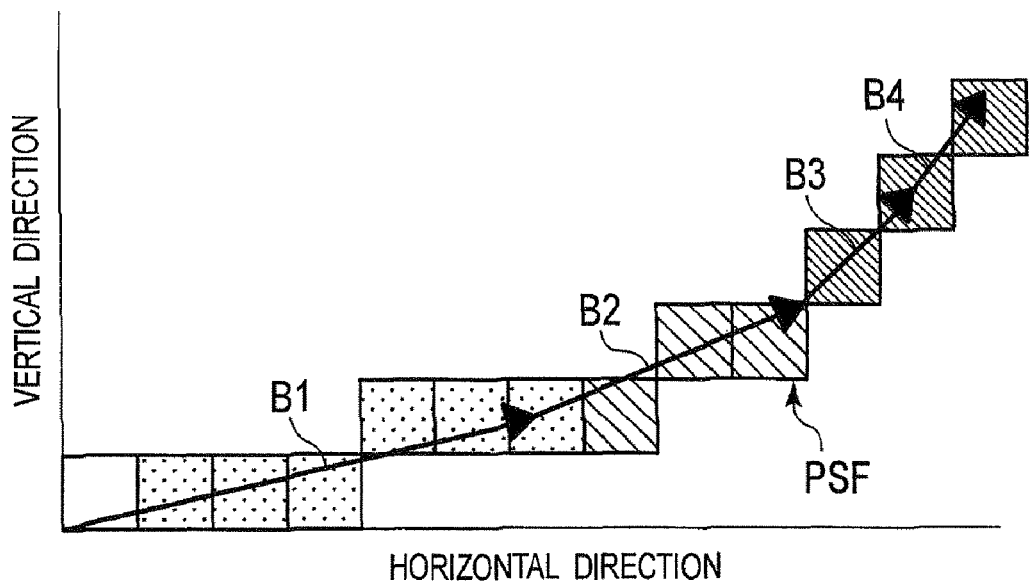
FIG. 6 is a graph in which the motion vector quantified by integers is converted into a PSF.

In the second place, a method of converting a motion vector to a PSF is described by using FIGS. 5 and 6. FIG. 5 shows a graph in which the motion vector shown in FIG. 4 is expressed on a pixel basis. FIG. 6 shows a PSF converted from the motion vector quantified by integers in FIG. 5.

The motion vector obtained by the [1] camera shake signal/motion vector conversion processing includes a value smaller than a unit pixel value. For this reason, the motion vector complicates the subsequent processing if it is used in the subsequent processing without conversion. Accordingly, the motion vector is pixelated. One of methods of pixelating a motion vector is a method based on the Bresenham's line algorithm, for example. This algorithm is one used to select optimum pixels to draw a line passing through certain two points designated on a digital screen.

The case where this method is applied to the motion vector B in FIG. 4 will be explained by taking the vector B1 as an example. First of all, the slope of the vector B1 is determined. Precisely, the slope is determined by comparing the horizontal increase amount and the vertical increase amount between the start point and the end point of the vector B1. In the case of the vector B1, the horizontal increase amount is larger than the vertical increase amount, and both the increase of X and the increase of Y are positive. Thus, the slope is determined as a positive value smaller than 1.

In this case, as shown in FIG. 5, the horizontal coordinate value of the motion vector is sequentially incremented by one, starting from a pixel (corresponding to one square in a grid in FIG. 5) of the origin O (0,0). Then, when the horizontal coordinate takes a value incremented by one, the vertical coordinate of the vector B1 is determined as follows. If the vertical coordinate value is not incremented by one from the value of the previous vertical coordinate corresponding to the previous horizontal coordinate, as in a pixel A, the vertical coordinate of the motion vector is set to the same value as the previous horizontal coordinate.

Subsequently, the vertical coordinate values are determined one by one while the horizontal coordinate value is sequentially incremented by one. When the motion vector has a current vertical coordinate value differing from the previous vertical coordinate value by 1 or more, as in a pixel C in FIG. 5, the vertical coordinate value is incremented by one. This processing is performed for the vector B1 from the start point to the end point to select pixels, and then, the processing for the vector B2 is performed in the same manner. In this processing, a pixel of the start point of the vector B2 is determined to be the same pixel as the end point of the vector B1. Consequently, the selected pixels are made continuous like the motion vector B shown in FIG. 4.

Through iterative execution of this processing, a pixelated motion vector Ba is obtained as shown in FIG. 5. Incidentally, in the above example, since the absolute value of the horizontal increase amount is larger than that of the vertical increase amount, the vertical coordinate value is determined to select a pixel while the horizontal coordinate value is incremented by one. However, inversely, if the absolute value of the vertical increase amount is larger than that of the horizontal increase amount, the horizontal coordinate value is determined to select a pixel while the vertical coordinate value is incremented by one. Instead, if the larger one of the horizontal and vertical increase amounts in terms of the absolute value takes a negative value, the coordinate value corresponding to the smaller increase amount is determined to select a pixel while the coordinate value corresponding to the larger increase amount is decremented by one.

Next, after the pixelated motion vector Ba shown in FIG. 5 is obtained, the pixels are weighted according to the sizes of the vectors B1 to B4. This weighting is based on the sizes, i.e., the lengths of the vectors B1 to B4. More specifically, a pixel is assigned a weight corresponding to the reciprocal of the length of the corresponding vector. A large weight is set particularly for a part where a velocity of a shake is low, that is, a part including a short vector. This is because such a short vector part indicates that the same or similar signals are inputted to the image pickup element for a relatively long time, and accordingly includes important signals of the image information piece.

As a result of assigning weights to the selected pixels, pixels as shown in FIG. 6 are obtained. FIG. 6 shows a pixel having a larger weight assigned thereto as a darker-colored pixel. Thus, the setting is made such that a larger weight can be assigned to the pixels obtained by the conversion of the vector B1 than that of the pixels obtained by the conversion of the vector B4. Moreover, the weights for pixels are determined to satisfy a condition that the total sum of the weights of all the pixels is 1. Consequently, as shown in FIG. 6, the PSF is obtained by pixelating the motion vector B and then by weighting the pixels thus obtained.

[3] PSF/Image Restoration Filter Conversion Processing

Prior to description for a method of obtaining an image restoration filter by converting a PSF obtained through the [2] motion vector/PSF conversion processing, description will be provided, with reference to FIGS. 7A to 7C, for a method of correcting an image information piece with filter coefficients. FIGS. 7A and 7B show schematic diagrams of pixels of an image restoration filter and of an image information piece, respectively.

Here, this image information piece is assumed as digitalized with resolution of horizontal $N_h$ pixels×vertical $N_v$ pixels. Under this assumption, pixel values of a pixel at a horizontally i-th position and vertically j-th position are expressed as $p(i,j)$ where i and j are positive integers.

When pixel information is corrected by use of filter coefficients having a square area, a target pixel and its adjacent pixels in the pixel information are multiplied by their respectively corresponding pixels of the filter coefficients and then the obtained values are summed up. At this time, assume that the center pixel of the filter coefficients, i.e., a pixel corresponding to a target pixel in the image information piece is expressed as $h(l,m)$. Here, for the sake of convenience, letting l and m denote integers within a range from −n to n inclusive (n is an integer of at least 0), a pixel value $p_a$ of the corrected target pixel can be expressed as the following equation:

$$p_a(i, j) = \sum_{l=-n}^{l=n} \sum_{m=-n}^{m=n} h(l, m) \times p(i+l, j+m).$$ [Equation 1]

The operation expressed as above is explained by taking an example where n=1 with reference to FIGS. 7A to 7C. As shown in FIG. 7A, when n=1, the filter coefficients have an area of 3×3. Here, letting the pixel value of the target pixel be $p(i,j)$ as shown in FIG. 7B, the target pixels and its adjacent pixels are multiplied by values of the filter coefficients corresponding to the positions of the respective pixels. As a result, 9 values are obtained as shown in FIG. 7c: $h(-1,1) \times p(i-1,j+1)$, $h(0,1) \times p(i,j+1)$, $h(1,1) \times p(i+1,j+1)$, $h(-1,0) \times p(i-1,j)$, ..., $h(1,-1) \times p(i+1,j-1)$.

Thereafter, the 9 values calculated through the multiplication are summed up to obtain a value for the pixel value of the corrected target pixel. This calculation is iteratively carried out for all the pixel values $p(i,j)$, whereby the image information piece is corrected.

Here, consider the case where the PSF obtained through [2] motion vector/PSF conversion processing is modeled into filter coefficients having an area of $(2n+1) \times (2n+1)$ where n is an integer of at least 0. These filter coefficients can be considered as filter coefficients to correct an image by giving blurring to the image. Precisely, the filter coefficients are considered as in an equation (pixel values of non-blurring image)×(filter coefficients of modeled PSF)=(pixel values of blurring image). Then, letting a certain pixel value in an non-blurring image composed of horizontal $N_h$ pixels and vertical $N_v$ pixels be $p(i,j)$, the filter coefficient obtained from the PSF be $h(l,m)$, and a certain pixel value of a blurring image be $p_a(i,j)$, each of the pixel values of the blurring image can be expressed as follows:

$$p_a(1, 1) = \sum_{l=-n}^{l=n} \sum_{m=-n}^{m=n} h(l, m) \times p(1+l, 1+m)$$ [Equations 2]

$$p_a(1, 2) = \sum_{l=-n}^{l=n} \sum_{m=-n}^{m=n} h(l, m) \times p(1+l, 2+m)$$

$$\vdots$$

$$p_a(1, N_v) = \sum_{l=-n}^{l=n} \sum_{m=-n}^{m=n} h(l, m) \times p(1+l, 2+m)$$

$$p_a(2, 1) = \sum_{l=-n}^{l=n} \sum_{m=-n}^{m=n} h(l, m) \times p(1+l, 2+m)$$

$$\vdots$$

$$p_a(2, N_v) = \sum_{l=-n}^{l=n} \sum_{m=-n}^{m=n} h(l, m) \times p(1+l, 2+m)$$

$$\vdots$$

$$p_a(N_h, N_v) = \sum_{l=-n}^{l=n} \sum_{m=-n}^{m=n} h(l, m) \times p(1+l, 2+m).$$

The above equations can be collectively expressed as a matrix. The matrix representing these equations is $P_a = H \times P$ where each of P and $P_a$ is a matrix having elements of an image information piece arranged one-dimensionally in a raster scanning order.

Here, a matrix $H^{-1}$, which is an inverse matrix of a matrix H representing the filter coefficients, is obtained and then the blurring image is multiplied by $H^{-1}$. In short, an image information piece P having blurring corrected therein can be obtained through the calculation of $p_a \times H^{-1}$. However, since this $H^{-1}$ does not exist normally, a generalized inverse matrix or a pseudo-inverse matrix is obtained instead. For instance, the equation for obtaining an generalized inverse matrix H* can be expressed as $H^* = (H^t \cdot H + \gamma \cdot I)^{-1} \cdot H^t$, where $H^t$ denotes a transposed matrix of a matrix H; γ denotes a scalar of a parameter for adjusting the magnitude of correction; and I denotes a unit matrix having the same size as the matrix H$^t$·H. Small correction is made if γ is set to a large value while large correction is made if γ is set to a small value.

Then, if the image information piece P$_a$ having blurring is multiplied by the matrix H* thus obtained, the image information piece P having blurring corrected therein is obtained. However, in the case where the size of image information piece on the pixel basis is 640×480, each of the image information pieces P and P$_a$ are a matrix of 307200×1 and H* is a matrix of 307200×307200. Such large matrices are not usable practically to calculate the above equation. For this reason, the matrices are reduced in size in the following manner and then are used.

Firstly, the size of an image on the pixel basis is set to 63×63. With this setting on this order, the image information pieces P and P$_a$ each are a matrix of 3969×1, and H* is a matrix of 3969×3969. Use of these matrices makes the calculation of the equation easy. Here, H* is a matrix for correcting the whole image information piece P$_a$ including blurring to obtain the whole image information piece P having the blurring corrected therein. A product of each row of H* and its corresponding row of P$_a$ is equivalent to an operation to correct each pixel.

Accordingly, the product of the central row of H* and the central row of P$_a$ is equivalent to an operation of correcting the central pixel of P$_a$. Thus, the central row of H* is extracted and is converted into a two-dimensional expression through inverse raster scanning. Consequently, the filter coefficients illustrated in FIG. 7A are obtained. The filter coefficients thus obtained are used as the image restoration filter.

[4] Image Information Correction Processing

The multiply-accumulate operation is performed on each pixel and its adjacent pixels of image information P$_a$ including blurring with the image restoration filter obtained from the blurring information piece through the three kinds of processing [1] to [3] This multiply-accumulate operation using the image restoration filter is performed in the same manner as the method of calculating the filter coefficients illustrated in FIG. 7C. Specifically, the pixel values of a target pixel and its adjacent pixels are respectively multiplied by the values of the filter coefficients corresponding to the positions of the respective pixels. Then, a corrected pixel value of the target pixel is obtained by adding up all the values thus obtained.

Note that the method of the correction processing [1] to [4] is only one example of the image restoration-based correction method, and can be implemented with modification added thereto as necessary. Moreover, the correction processing [1] to [4] may be performed in combination with another kind of processing. For example, an image information piece may be corrected through correction processing with a median filter once before and once after the correction processing [1] to [4]. In the case of an area including a target pixel and its adjacent pixels, for example, an area of 3×3, this median filter firstly converts the value of the target pixel into the median value (the fifth largest value among nine values in an example of a 3×3 filter). Thus, this filtering processing reduces a noise component having an extraordinary value.

<Blurring Amount>

Figure 8:
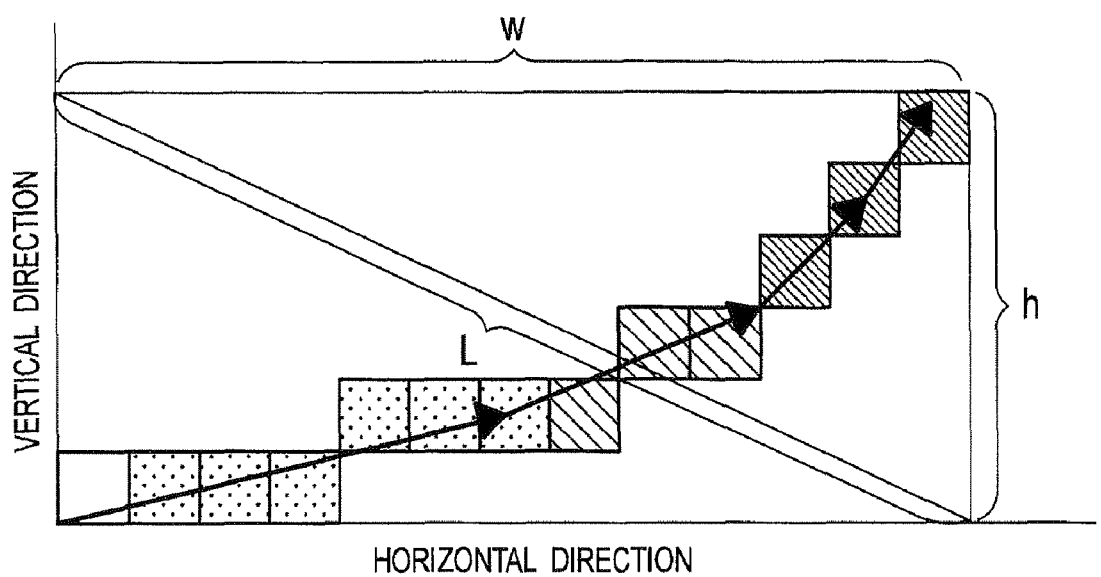
FIG. 8 is a schematic diagram of a PSF.

Here, description is provided for a blurring amount used in the blur correction device, an electronic apparatus including this blur correction device, and in its blur correction method according to this embodiment of the present invention. The blurring amount is obtained from aforementioned PSF, and indicates a range of blurring as a numeric value. With reference to FIG. 8, a method of figuring out this blurring amount will be described by taking the case where a blurring amount is obtained from the PSF shown in FIG. 6 as an example. FIG. 8 is a schematic diagram of a PSF equivalent to the PSF in FIG. 6.

As shown in FIG. 8, a rectangular region on the pixel basis is circumscribed around elements (pixels) of a PSF having a value other than 0, and then a blurring amount L is calculated by figuring out the length of the diagonal line of the rectangular region. Thus, when the horizontal length and the vertical length of the circumscribed rectangular denotes w and h, respectively; and the length of the diagonal line denotes L, the blurring amount L is expressed as $(w^2+h^2)^{1/2}$.

In the electronic apparatus configured to perform the blur correction according to this embodiment of the present invention and its blur correction method, the blurring amount L is used as a reference to rearrange image files, to calculate a time required for correction, and to determine whether to perform blur correction. Description of a blur correction operation using the blurring amount L will be described in detail below in Example 1.

Example 1

Hereinafter, a blur correction device in Example 1, and an electronic apparatus including this blur correction device, and its blur correction method will be described. Prior to this detailed description, required conditions for the blur correction device, the image pickup apparatus and the blur correction method in Example 1 are described. Note that, these required conditions are also applied to Example 2, which will be described later.

In following Example 1, firstly, the electronic apparatus including the blur correction device is explained as an image pickup apparatus including an imager as shown in FIG. 1. This electronic apparatus includes a battery and operates by receiving power supply from the battery unless particularly stated otherwise.

In following Example 1, the blur correction method in the blur correction employs the foregoing image restoration-based correction method, and allows image information pieces of image files to be corrected collectively. In the following description, "collective image information correction" means to successively correct multiple image information pieces of multiple image files when a user selects the multiple image files.

Moreover, in following Example 1, a blurring information piece included in an image file is any one of a motion vector (this may be expressed with pixels as shown in FIG. 5 or may not be expressed with pixels as shown in FIG. 4, hereinafter the same), a PSF and an image restoration filter. A blurring amount is calculated from the PSF as described above. In addition, a phrase that the blurring amount is obtained indicates the following three kinds of situations. Firstly, if the blurring information piece is a motion vector, the blurring amount is calculated after the motion vector is converted into the PSF. Secondly, if the blurring information piece is the PSF, the blurring amount is calculated directly from this PSF as described above. Thirdly, if the blurring information piece is an image restoration filter, the blurring information piece is calculated in advance by use of the PSF obtained in the calculation for the image restoration filter. Moreover, the image restoration filter, which is the blurring information piece, and the blurring amount are added to the image file. Then, the blurring amount thus added is directly obtained from the image file.

Alternatively, two or all of a motion vector, PSF and an image restoration filter may be used in combination as the blurring information piece. Otherwise, in one of applicable configurations, the blurring amount is calculated and then included in the blurring information piece in advance. In this configuration, the blurring amount is obtained without any calculation. Incidentally, the blurring information piece may be compressed and then added to the image file.

Figure 9A:
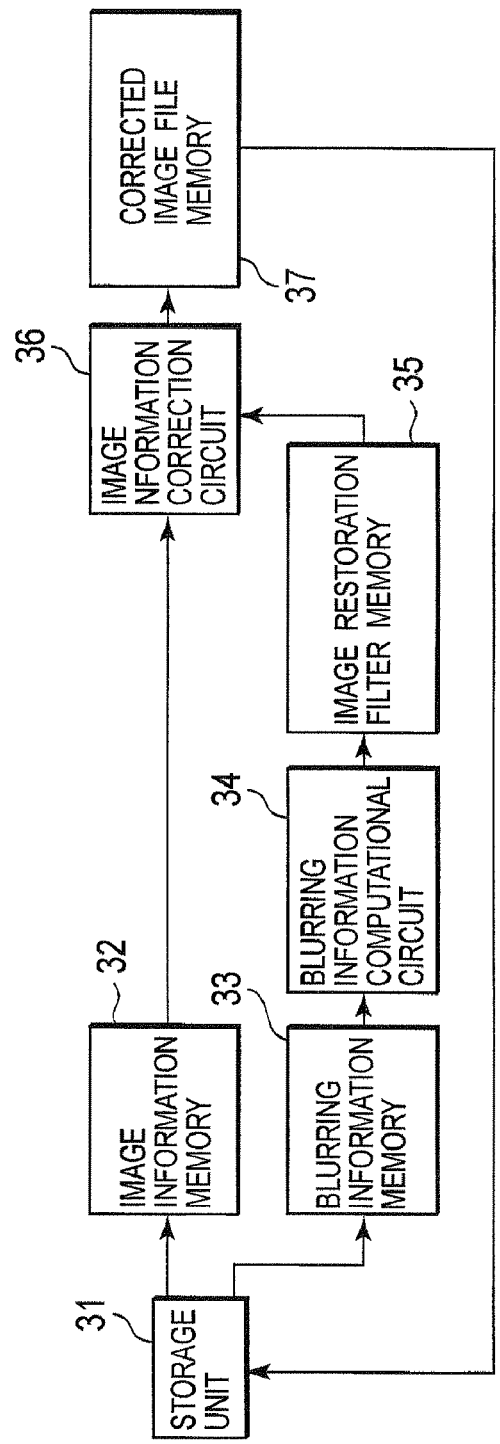
FIGS. 9A and 9B are a block diagram showing a configuration of a blur correction device in Example 1, and a schematic diagram showing the outline of operations.
Figure 9B:
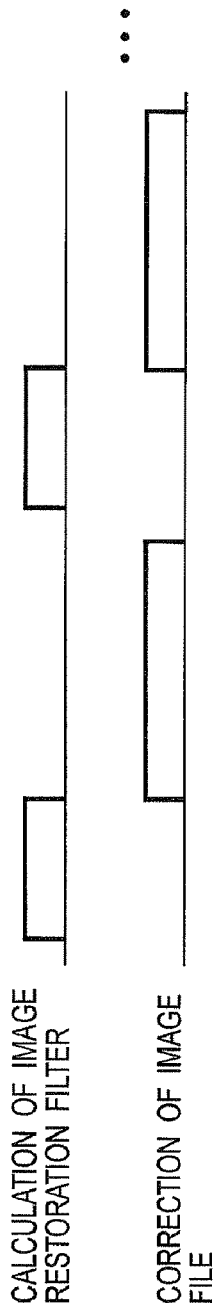

Next, the outline of a configuration and operation of the blur correction device in Example 1 will be described by using FIGS. 9A and 9B. FIG. 9A is a block diagram of the blur correction device in Example 1, and shows in detail a part equivalent to the blur correction unit 3 in FIG. 1 that shows the configuration of the image pickup apparatus. FIG. 9B is a conceptual diagram schematically showing timings in the correction operations of the blur correction device in Example 1.

As described above, when an image information piece is corrected, a blurring information piece is converted to generate an image restoration filter and then the image information piece is processed through the filtering with the generated filter. As shown in FIG. 9A, a blur correction device 30 includes: a storage unit 31 configured to store image files each including an image information piece and blurring information piece; an image information memory 32 configured to temporarily store the image information piece read from the storage unit 31; a blurring information memory 33 configured to temporarily store the blurring information piece; a blurring information computational circuit 34 configured to generate an image restoration filter from a blurring information piece and to output the image restoration filter; an image restoration filter memory 35 configured to temporarily store the image restoration filter outputted from the blurring information computational circuit 34; an image information correction circuit 36 configured to correct the image information piece with the image restoration filter to generate a corrected image file; and a corrected image file memory 37 configured to receive an output of the corrected image file and to temporarily store the corrected image file.

An outline of the operations of the blur correction device in Example 1 will be described with reference to FIGS. 9A and 9B. Once the correction operation starts, the image information piece of an image file stored in the storage unit 31 is read to the image information memory 32, and concurrently the blurring information piece thereof is read to the blurring information memory 33. Then, the blurring information computational circuit 34 performs the aforementioned computation processing after reading the blurring information piece, thereby converting the blurring information piece into a motion vector or PSF. Eventually, the image restoration filter is generated and then stored in the image restoration filter memory 35. Since the image information piece of this image file cannot be corrected during the generation of this image restoration filter, the image information piece is continuously held in the image information memory 35. For this reason, as shown in FIG. 9B, the image information correction circuit 36 is out of operation and remains in a standby state until the image restoration filter is generated.

Thereafter, once the image restoration filter is generated, the image restoration filter is read from the image restoration filter memory 35 to the image information correction circuit 36, and is set therein. Then, the image information piece is read from the image information memory 32 to the image information correction circuit 36. Thus, the correction operation starts. Upon completion of the correction operation, the corrected image file is outputted to the corrected image file memory 37, is temporarily stored therein, then is transmitted to the storage unit 31, and is stored by the storage unit 31. Subsequently, the blurring information piece and the image information piece of an image file to be corrected next through the correction processing are concurrently read to the blurring information memory 33 and the image information memory 32, respectively. Thereafter, the same operation as described above is performed.

Hereinafter, operations of the image pickup apparatus including the foregoing blur correction device will be described. In the first place, an outline of the whole operations of the image pickup apparatus will be described by use of a flowchart in FIG. 10.

Figure 10:
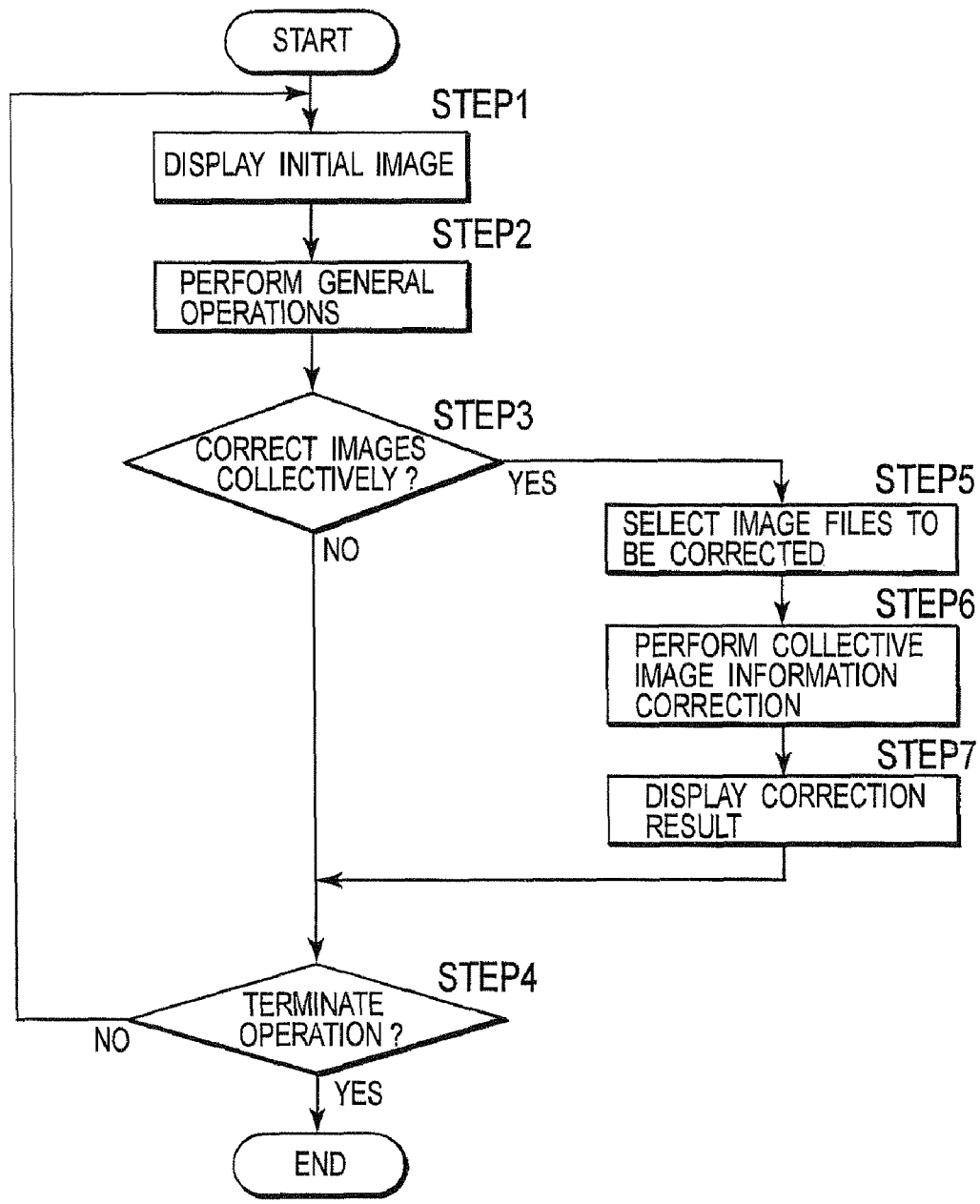
FIG. 10 is a flowchart showing the outline of whole operations in an image pickup apparatus including the blur correction device in Example 1.

As shown in FIG. 10, once the image pickup apparatus starts operation, an initial image is displayed (STEP 1) at first, and then a user performs any of general operations according to user's necessity (STEP 2). The general operations include an operation, for example, for deleting an image file, correcting a single image information piece, and cancelling correction, which will be described in more detail later. Here, the general operations do not include determining whether to perform the collective image information correction operation.

Upon completion of the general operation in STEP 2, a user selects whether to perform the collective image information correction operation. If the user selects the option not to perform the collective image information correction operation (STEP 3: NO), then the user selects whether to terminate the operation of the image pickup apparatus (STEP 4). If the user inputs an instruction to terminate the operation of the image pickup apparatus (STEP 4: YES), the image pickup apparatus terminates its operation. In contrast, if the user does not input the instruction to terminate the operation of the image pickup apparatus (STEP 4: NO), the operation returns to STEP 1 to display the initial image.

If the user selects the option to perform the operation of the collective image information correction (STEP 3: YES), the user firstly selects an image file to be corrected (STEP 5). Then, after the image file is selected in STEP 5, the image information pieces of the selected image file is corrected (STEP 6). After the correction of the image information pieces in STEP 6, the images of the original and corrected image files are displayed, and thus the user checks the images of the original and corrected image files (STEP 7).

After the user checks the images of the original and corrected image files in STEP 7, the user selects whether to terminate the operation of the image pickup apparatus (STEP 4). Then, if the user inputs the instruction to terminate the operation of the image pickup apparatus (STEP 4: YES), the image pickup apparatus terminates its operation. On the other hand, if the user does not input the instruction to terminate the operation of the image pickup apparatus (STEP 4: NO), the operation returns to STEP 1 to display the initial image.

Figure 11:
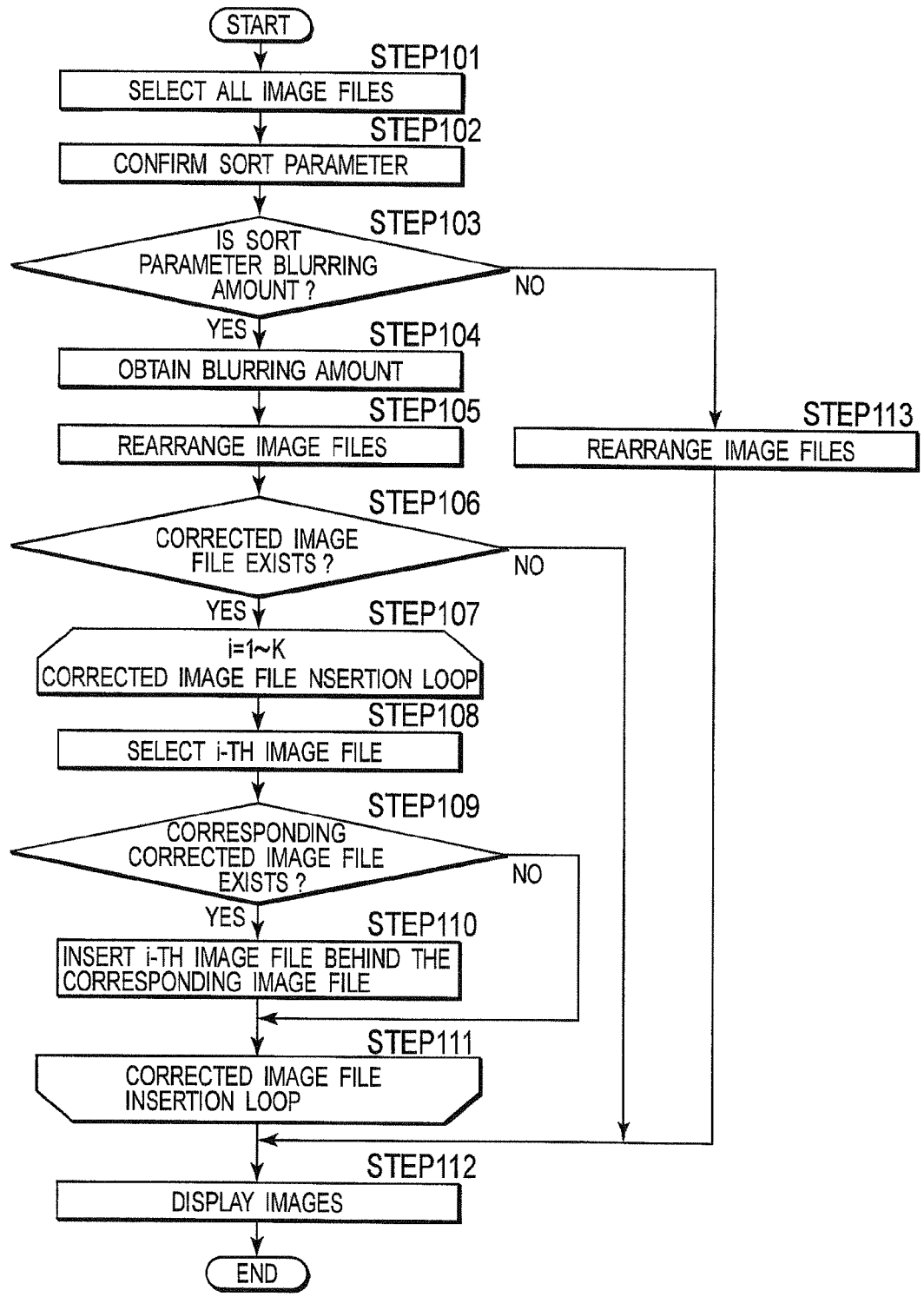
FIG. 11 is a flowchart showing an initial image display operation.

Next, descriptions will be provided for more detailed operations in [1] initial image display operation (STEP 1), [2] general operations (STEP 2), [3] correction-target image file selection operation (STEP 5), [4] collective image information correction operation (STEP 6) and [5] correction result display operation (STEP 7), which are shown in FIG. 10. To begin with, STEP 1 for displaying the initial image will be described by using a flowchart in FIG. 11.

[1] Initial Image Display Operation

When the initial image display operation starts, all the image files stored in the image pickup apparatus are selected (STEP 101). As described above, the storage unit 31 in FIG. 9 stores both original and corrected image files. Thus, all the original and corrected image files stored on the storage unit 31 are selected. Then, a sort parameter is confirmed (STEP 102) in order to rearrange all the image files selected in STEP 101. The user can set this sort parameter by selecting one of the forgoing blurring amount, the numeric part of the image file name (the part indicating 0017 in "ORGN0017" and "STAB0017" of the foregoing example) and the like.

If the sort parameter confirmed in STEP 102 is not the blurring amount but the numerals of the image file name mentioned above (STEP 103: NO), the image files are rearranged according to this sort parameter (STEP 113) and the images of the image files are displayed in the rearranged order (STEP 112). At this time, as described above, the images of only the original and corrected image files with the extension JPG are displayed while the images of image files with the extension TMP are not displayed. Such extension setting will be also described later. Thus, the images are displayed in STEP 112, and concurrently the initial image display operation is terminated.

In contrast, if the sort parameter is the blurring amount (STEP 103: YES), the blurring amounts are obtained from the blurring information pieces in the original image files (STEP 104), and then the original image files are rearranged (STEP 105). On this occasion, the alphabet part of the image file name (the ORGN and STAB parts in the "ORGN0017" and "STAB0017" of the foregoing example) is used to determine whether an image file is an original image file. In what follows, the same manner is used to determine whether an image file is an original or corrected one.

After the original image files are rearranged according to the blurring amount in STEP 105, it is determined whether or not a corrected image file exists (STEP 106). If no corrected image file exists (STEP 106: NO), only the original image files rearranged according to the blurring amount are displayed (STEP 112). Thus, the images are displayed in STEP 112, and concurrently the initial image display operation is terminated.

On the other hand, if a corrected image file exists (STEP 106: YES), a corrected image file inserting loop operation is performed (STEP 107 to 111). This loop operation is to insert a corrected image file behind its corresponding original image file rearranged according to the blurring amount, and is iteratively performed for all corrected image files. Assuming that the total number of corrected image files is K, the loop operation is terminated upon completion of the operation for first to k-th corrected image files.

Once this corrected image file insertion loop operation starts (STEP 107), the first corrected image file is selected at first (STEP 108). Then, it is determined whether there is an original image file corresponding to the corrected image file selected in STEP 108 (STEP 109). More specifically, the correspondence between the original and corrected image files is determined by use of the numeric parts of the image file names (the "0017" parts in "ORGN0017" and "STAB0017" of the above example). In what follows, the correspondence is determined in the same manner.

If the original image file exists (STEP 109: YES), the corrected image file is inserted immediately behind the original image file (STEP 110). Then, it is determined whether to terminate the loop operation (STEP 111). In contrast, if the original image file does not exist (STEP 109: NO), it is determined whether to terminate the loop operation without changing the position of the corrected image file.

If the loop operation has not been performed for the k-th corrected image file in STEP 111, the operation returns to STEP 107, and then the loop operation is again performed with the next corrected image file selected (STEP 108). On the other hand, if the loop operation has been performed for the k-th corrected image file, the loop operation is terminated and the image files are displayed in the rearranged order (STEP 112). As described above, in STEP 112, only original and corrected image files with the extension JPG are displayed while image files with the extension TMP are not displayed. Such extension setting will be described later. Thus, the images are displayed in STEP 112, and concurrently the initial image display operation is terminated.

Through the execution of a series of the above initial image display operations, all the image files are rearranged and displayed in a manner desired by the user. With this display of image files, the user can easily select a target image file in the subsequent general operation.

Figure 12A:
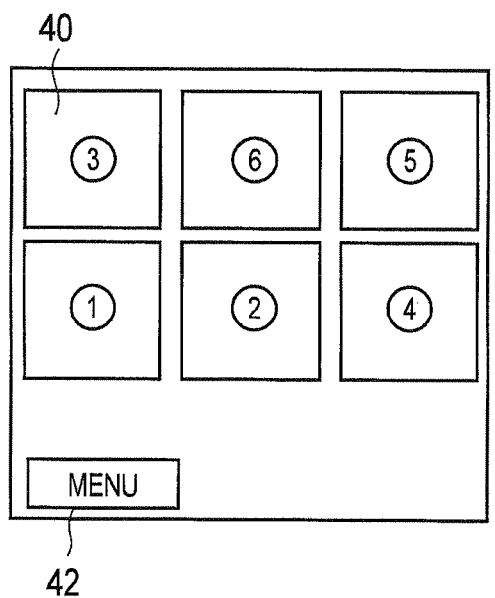
FIGS. 12A to 12D are schematic diagrams of initial display screens.

FIGS. 12A to 12D show schematic views of screens displayed as the initial images. The screen shown in FIG. 12A is one displayed in the case where the blurring amount is set as the sort parameter in STEP 105 in FIG. 11. More precisely, thumbnail images 40 in descending order of the blurring amount are arranged from the upper-left side to the lower-right side of the screen. A number assigned to each of the thumbnail images 40 in FIG. 12A is equivalent to the number part of the name of the image file. In FIGS. 12A to 12D, for the sake of simplification, the numbers 1 to 6 are used to indicate the respective thumbnail images 40 of the image files.

Figure 12B:
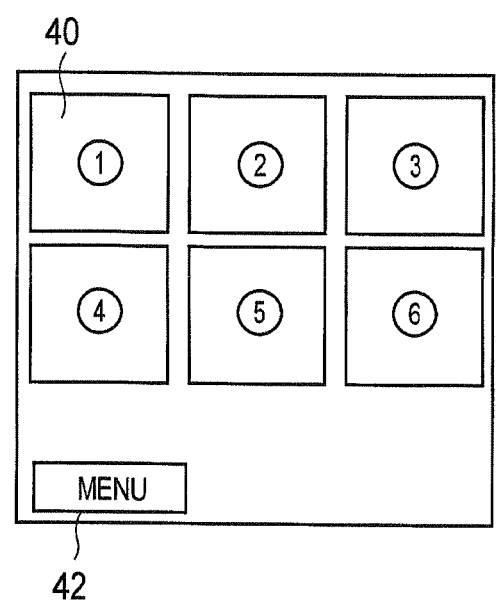
Figure 12C:
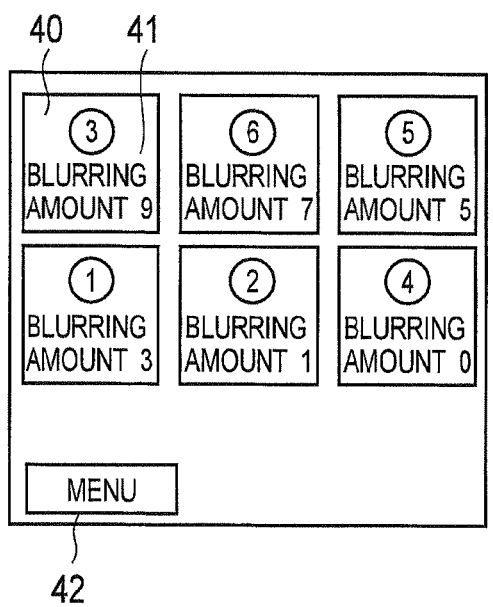

Incidentally, in the initial image display, blurring amounts 41 may be displayed inside the respective thumbnail images 40 as shown in FIG. 12C, or may be displayed outside the thumbnail images 40. In addition, in FIGS. 12A to 12C, only original image files are displayed on the screen, but both original and corrected image files can be displayed on the screen. A menu 42 displayed on the lower-left side of the screen in each of FIGS. 12A to 12D is operated as needed by the user when the user performs any of the general operations or an operation for the collective image information correction, which will be described later.

Figure 12D:
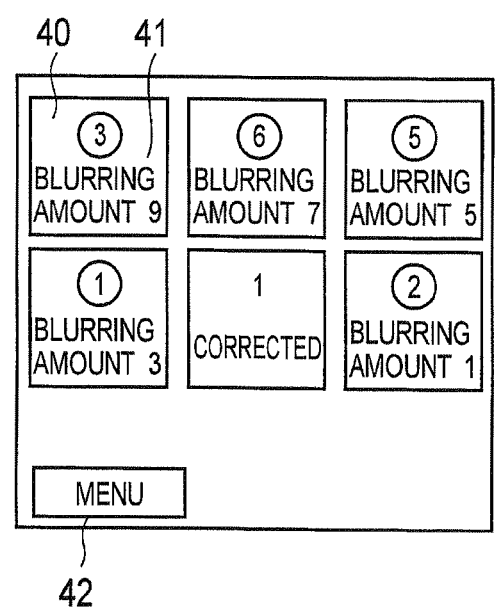

FIG. 12D shows an example of the screen displaying both original and corrected image files that is switched from the screen in FIG. 12C. More specifically, FIG. 12D shows the case where a corrected image file corresponding to a first image file is stored. As shown in FIG. 12D, the corrected image file is displayed in the position subsequent to its corresponding original image file. In this example, however, since only 6 thumbnail images 40 can be displayed at one time, the thumbnail image of a fourth image file is not displayed on the screen in FIG. 12D. When the user presses a button or the like for displaying the thumbnail image of the following image file, the thumbnail image of the fourth image file is displayed.

In contrast, FIG. 12B shows a screen displayed in the case where the image files are rearranged, for example, according to the image file number in STEP 113. When the image files are displayed with their respective thumbnail images as in FIG. 12A, the image files rearranged according to the number part of the image file name are displayed as shown in FIG. 12B. In this case, incidentally, the blurring amounts may be displayed in the respective thumbnail images as in FIG. 12C.

Although FIGS. 12A to 12D each show the image files with their respective thumbnail images 40, the image files in large size may be displayed sequentially by switching from one to another in response to an event where the user presses a next or back button. Moreover, in these examples, only six thumbnail images 40 are displayed, but a less or more number of thumbnail images 40 than six may be displayed.

[2] General Operations

Figure 13:
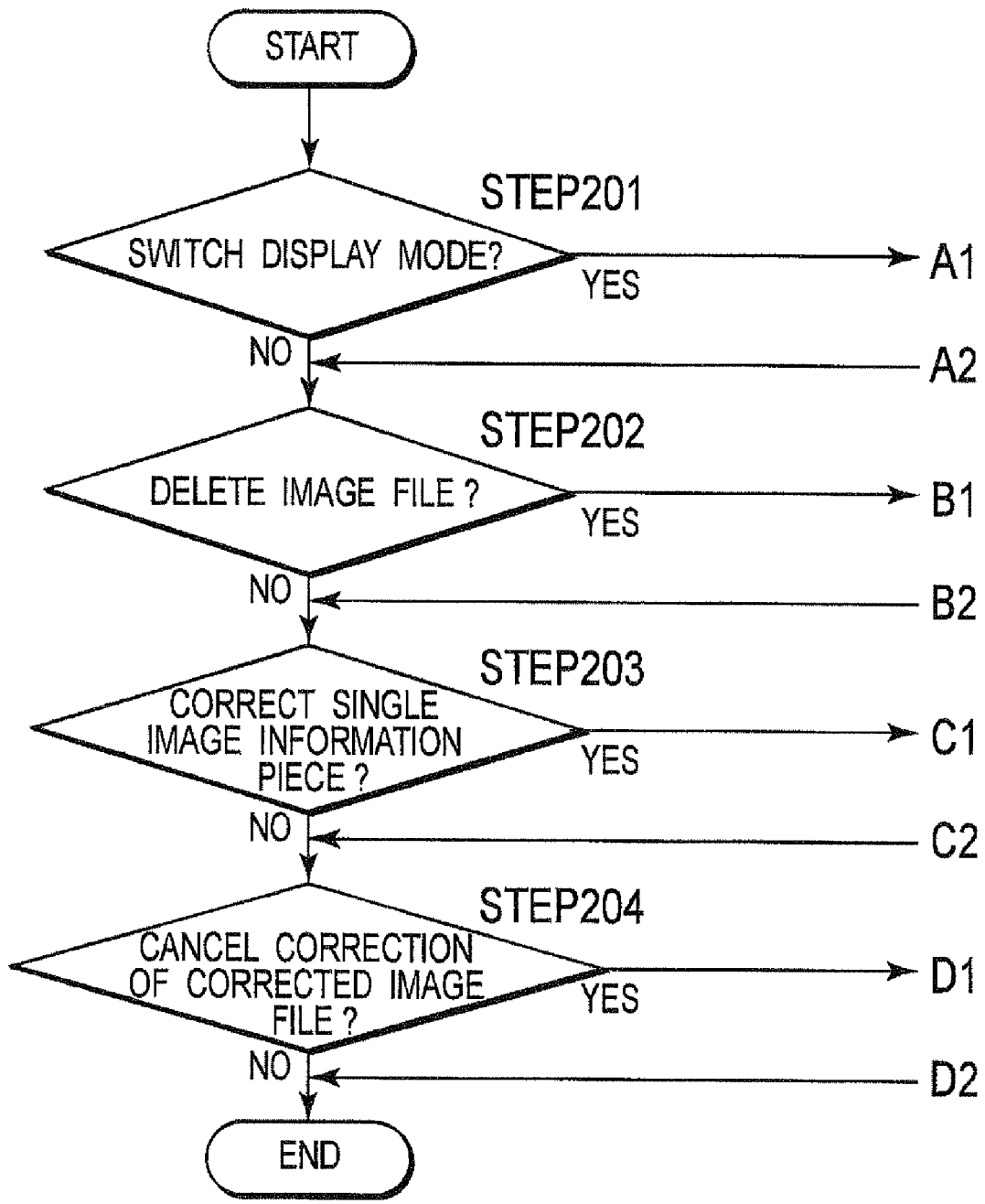
FIG. 13 is a flowchart showing the outline of general operations.

Hereinafter, the general operations performed after the [1] initial image display operation will be described by using flowcharts in FIGS. 13 to 17. FIG. 13 shows a flowchart of the whole flow of the general operations while FIGS. 14 to 17 show flowcharts of the respective general operations separately. Firstly, as shown in FIG. 13, the executable general operations include four operations of [2-1] display mode switching (STEP 201), [2-2] image file deletion (STEP 202), [2-3] single-piece image information correction (STEP 203), and [2-4] image file correction cancellation (STEP 204). The user determines whether to execute each of the operations.

[2-1] Display Mode Switching Operation

Figure 14:
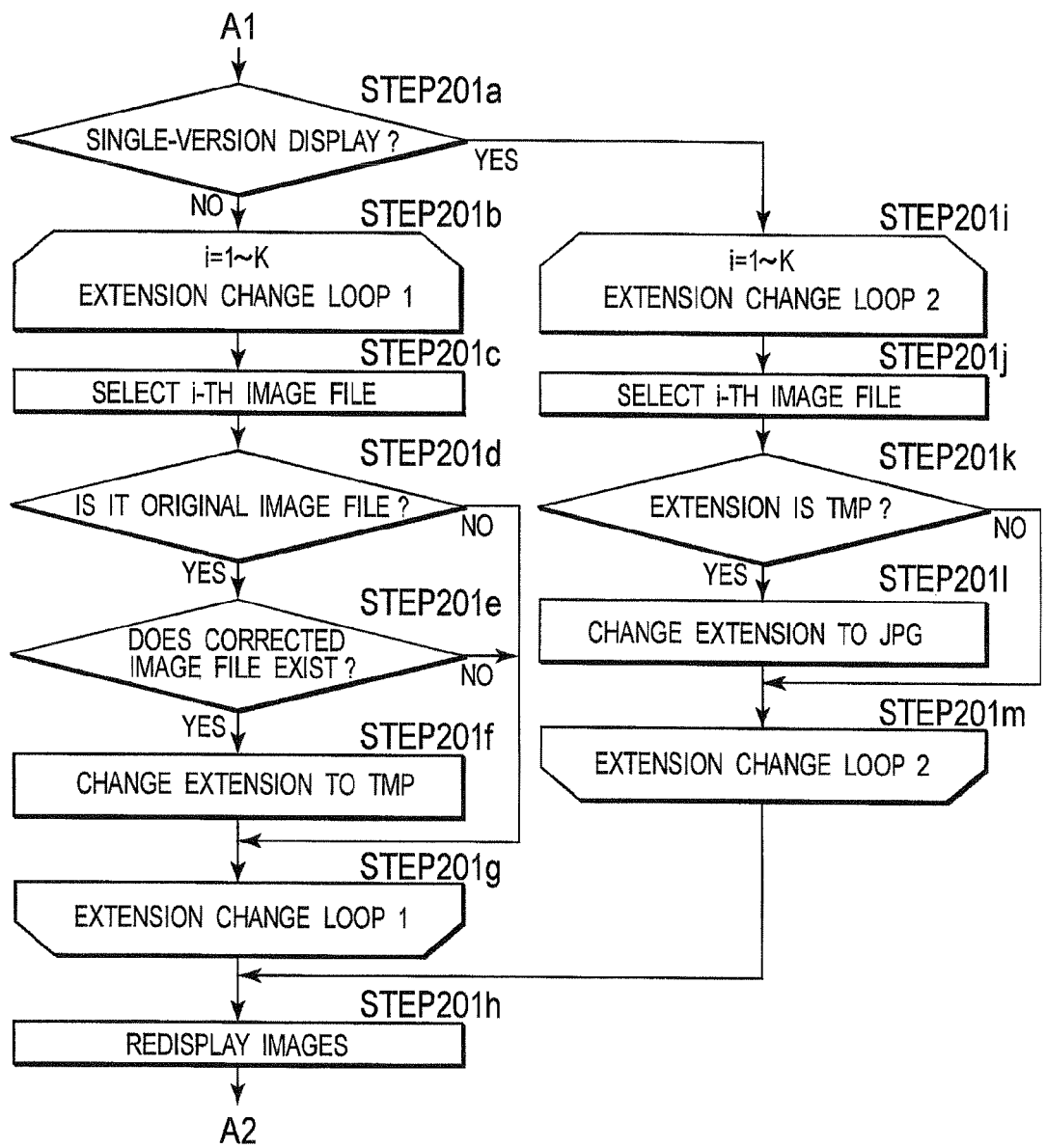
FIG. 14 is a flowchart showing a display mode switching operation of the general operation.

If the user issues an instruction to execute the display mode switching operation (STEP 201: YES) in the flow of FIG. 13, it is checked whether the current display mode is a single-version display or a both-version display (STEP 201a) as shown in FIG. 14. When there are original and corrected image files corresponding to a certain image, i.e., a pair of image files whose names have the different alphabet parts but same number part, only one of the original and corrected image files of the same image is displayed in the single-version display. On the other hand, in the both-version display, all the image files are displayed regardless of whether the image files are original or corrected ones.

If the display mode is currently the both-version display (STEP 201a: NO), an extension changing loop 1 is preformed to change the extension of an image file (STEP 201b to 201g) in order to switch to the single-version display. This loop operation is performed for all image files. Assuming that the total number of image files is M, the loop operation is terminated upon completion of the operation for the first to M-th image files.

Once the extension change loop 1 starts (STEP 201b), the first image file is selected at first (STEP 201c), and then it is checked whether or not the image file selected in STEP 201c is an original image file (STEP 201d). If the selected image file is not the original image file (STEP 201d: NO), it is determined whether to terminate this loop operation (STEP 201g). On the other hand, if the selected image file is the original image file (STEP 201d: YES), it is checked whether or not there is its corresponding corrected image file (STEP 201e).

Next, if there is no corrected image file corresponding to the selected image file (STEP 201e: NO), it is determined whether to terminate the loop operation (STEP 201g). On the other hand, if the corrected image file exists (STEP 201e: YES), the extension of the selected original image file is changed to TMP in order not to display the selected original image file (STEP 201f), and then it is determined whether to terminate the loop operation (STEP 201g).

If it is determined in STEP 201g that the operation for the M-th image file has not been performed, the operation returns to STEP 201b to continue this loop operation. Next, the next image file is selected (STEP 201c) and the same operation as described above is performed for the selected next image file. On the other hand, if the operation for the M-th image file has already been performed, the loop operation is terminated, and the images of the image files are redisplayed (STEP 201h). At this time, only the images of the image files with the extension JPG are displayed. Thereafter, the display mode switching operation is terminated, and a determination is made as to whether to delete an image file as shown in FIG. 13 (STEP 202).

By changing the extension as described above, only an original image file is hidden if its corresponding corrected image file is displayed. Thus, the display mode is switched to the single-version display in which only one of original and corrected image files of the same image is displayed.

Conversely, if the current mode is the single-version display when the display mode switching operation starts (STEP 201a: YES), an extension change loop 2 is performed to change the extension of an image file in order to switch to the both-version display (STEP 201i to 201m). This loop operation is performed for all the image files. Assuming that the total number of image files is M, the loop operation is terminated upon completion of the operation for the first to M-th image files.

Once the extension change loop 2 starts (STEP 201i), the first image file is selected at first (STEP 201j), and then it is checked whether or not the extension of the image file selected in STEP 201j is TMP (STEP 201k). If the extension of the selected image file is not TMP (STEP 201k: NO), it is determined whether to terminate this loop operation (STEP 201m). On the other hand, if the extension of the selected image file is TMP (STEP 201k: YES), the extension is changed to JPG (STEP 201l), and it is determined whether to terminate this loop operation (STEP 201m).

If it is determined in STEP 201m that the operation for the M-th image file has not been performed yet, the operation returns to STEP 201i to continue this loop operation. Next, the next image file is selected (STEP 201j) and the same operation is performed for the selected next image file. On the other hand, if the operation for the M-th image file has already been performed, the loop operation is terminated, and the images of the image files are redisplayed (STEP 201h). At this time, since all the image files have the extension JPG, the images of all the image files are displayed. Thereafter, the display mode switching operation is terminated, and a determination is made as to whether to delete an image file as shown in FIG. 13 (STEP 202).

Incidentally, to redisplay images means to display the images of the image files as in the initial image display. Moreover, in the following description, a phrase, "redisplay images" means to perform the display in the same manner as in the initial image display (for instance, the display with the thumbnails 40 as shown in FIGS. 12A to 12D) except for a particularly stated case. The redisplaying of images helps the user to easily select a target image file in the subsequent operation, and also to easily know what kinds of image files exist.

The changing of the extension as described above causes a hidden image file to be displayed. Thus, the display mode is switched to the both-version display, in which both original and corrected image files are displayed. Moreover, when the both-version display is switched to the single-version display, one of original and corrected image files is hidden only after the presence/absence of its corresponding image file is checked. As a result, although an image file not having its corresponding original or corrected files may be completely hidden otherwise, either original or corrected version for every image file is surely displayed. This prevents the user from completely forgetting the presence of every image file.

[2-2] Image File Deletion Operation

Secondly, the image file deletion operation is explained. As shown in FIG. 13, either after the display mode switching operation is performed and terminated (STEP 201: YES, A1 and A2), or when the display mode switching operation is not performed (STEP 201: NO), a determination is made as to whether to perform the image file deletion operation (STEP 202). If the user issues an instruction to execute the image file deletion operation (STEP 202: YES), the image file deletion operation is executed. Here, this image file deletion operation will be described in detail with reference to FIG. 15.

Figure 15:
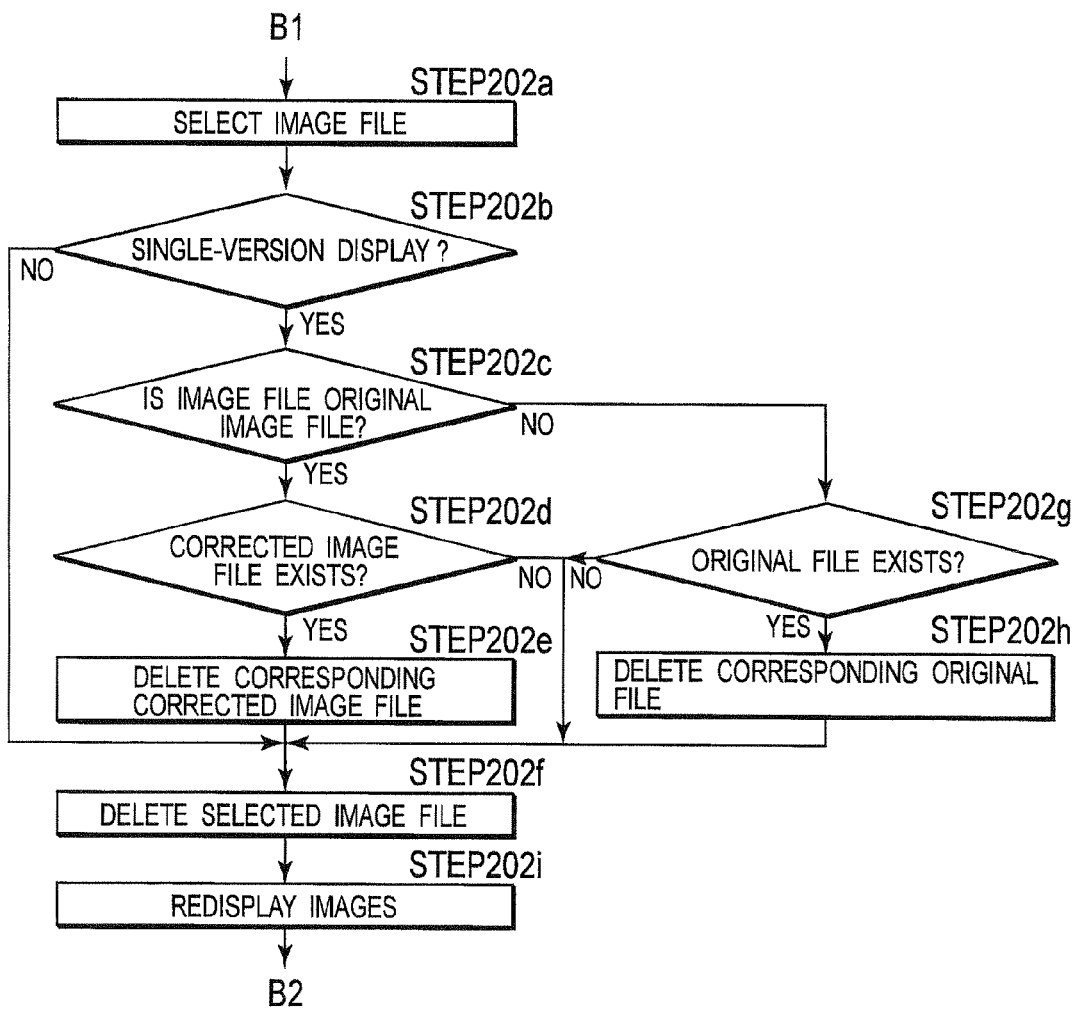
FIG. 15 is a flowchart showing an image file deletion operation of the general operation.

As shown in FIG. 15, upon start of the image file deletion operation, an image file to be deleted is selected firstly (STEP 202a). At this time, if the display mode is not the single-version display but the both-version display (STEP 202b: NO), the selected image file is deleted (STEP 202f). Then, after the deletion, the image files are redisplayed (STEP 202i)

and concurrently the image file deletion operation is terminated. Thereafter, a determination is made as to whether to correct a single image information piece for an image file as shown in FIG. 13 (STEP 203).

On the other hand, if image files are displayed in the single-version display (STEP 202*b*: YES), it is checked firstly whether or not the selected image file is an original image file (STEP 202*c*). If the selected image file is not an original image file but a corrected image file (STEP 202*c*: NO), it is checked whether or not its corresponding original image file exists (STEP 202*g*).

If the corresponding original image file does not exist (STEP 202*g*: NO), only the selected image file is deleted (STEP 202*f*). Then, after the deletion, the image files are redisplayed (STEP 202*i*) and concurrently the image file deletion operation is terminated. Thereafter, a determination is made as to whether to correct a single image information piece for an image file as shown in FIG. 13 (STEP 203).

Instead, even though the corresponding original image file exists (STEP 202*g*: YES), this corresponding original image file is not displayed because it has the extension TMP. If a user decides to delete an image file in the signal-version display, this indicates that the user considers that its corresponding original or corrected image file is also unnecessary. Accordingly, it is desirable to delete both original and corrected image files together. Hence, this corresponding original image file is deleted (STEP 202*h*) and the selected corrected image file is also deleted (STEP 202*f*). Then, after the deletion, the image files are redisplayed (STEP 202*i*) and concurrently the image file deletion operation is terminated. Thereafter, a determination is made as to whether to correct a single image information piece for an image file as shown in FIG. 13 (STEP 203).

In contrast, if the image file selected in STEP 202*a* is determined as an original image file (STEP 202*c*: YES), then it is determined whether or not its corresponding corrected image file exists (STEP 202*d*). If there is no corresponding corrected image file (STEP 202*d*: NO), only the selected image file is deleted (STEP 202*f*). After the deletion, the image files are redisplayed (STEP 202*i*) and concurrently the image file deletion operation is terminated. Thereafter, a determination is made as to whether to correct a single image information piece for an image file as shown in FIG. 13 (STEP 203).

Instead, even though the corresponding corrected image file exists (STEP 202*d*: YES), the corresponding corrected image file is not displayed because it has the extension TMP. Even in this case, not only is this corrected image file deleted (STEP 202*e*) but also the selected original image file is deleted (STEP 202*f*). After the deletion, the image files are redisplayed (STEP 202*i*) and concurrently the image file deletion operation is terminated. Thereafter, a determination is made as to whether to correct a single image information piece for an image file as shown in FIG. 13 (STEP 203).

The execution of the image file deletion operation as described above prevents only one of original and corrected image files displayed in the single-version display from being deleted. This prevents the user from forgetting the presence of a hidden image file and consequently does not allow the hidden file to exist for ever. In the case of the both-version display, even though one of the two files of the same image is deleted, the other one is displayed and therefore the presence thereof is not forgotten by the user.

[2-3] Single-Piece Image Information Correction Operation

Thirdly, the single-piece image information correction operation will be described. As shown in FIG. 13, either after the image file deletion operation is performed and terminated (STEP 202: YES, B1 and B2), or when the image file deletion operation is not performed (STEP 202: NO), a determination is made as to whether to correct a single image information piece for an image file (STEP 203). If the user issues an instruction to execute the single-piece image information correction operation (STEP 203: YES), the single-piece image information correction operation is executed. Here, this single-piece image information correction operation will be described in detail with reference to FIG. 16. Note that the single-piece image information correction operation includes: selecting one image file; and then correcting the image information piece of the selected image file.

Figure 16:
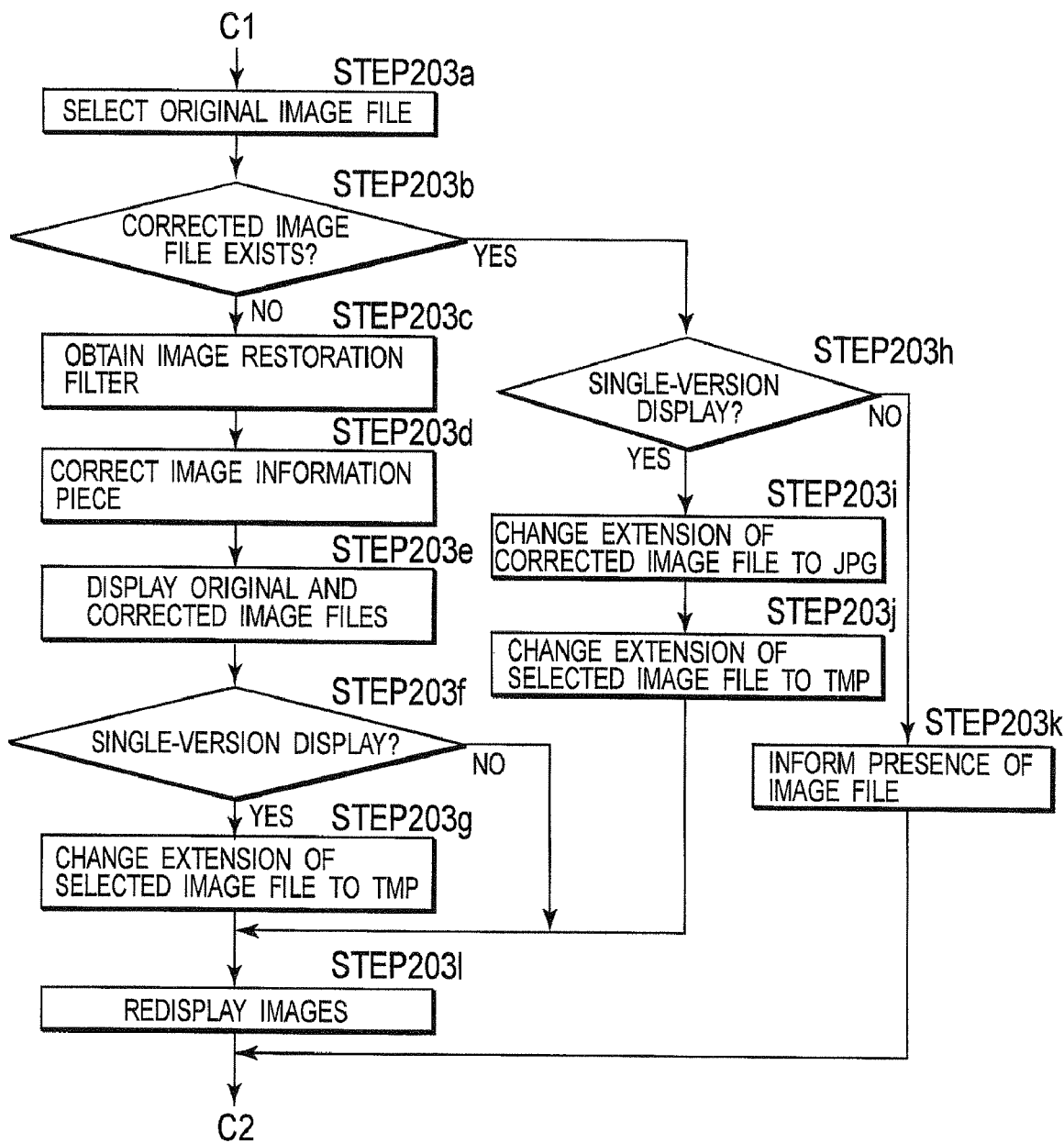
FIG. 16 is a flowchart showing a single-piece image information correction operation of the general operation.

As shown in FIG. 16, upon start of the single-piece image information correction operation for an image file, an original image file to be corrected is selected (STEP 203*a*). Then, it is checked whether there is a corrected image file corresponding to this selected image file (STEP 203*b*). If the corrected image file exists (STEP 203*b*: YES), the display mode is checked (STEP 203*h*).

If the display mode is the single-version display (STEP 203*h*: YES), the corrected image file is not displayed. Thus, the extension of the corrected image file is changed to JPG. Moreover, the extension of the selected original image file is changed to TMP (STEP 203*j*) for the single-version display and thus is set to be hidden. Thereafter, the image files are redisplayed (STEP 203*l*), and the single-piece image information correction operation is terminated. Subsequently, a determination is made as to whether to cancel the image file correction as shown in FIG. 13 (STEP 204).

Instead, if the display mode is not the single-version display but the both-version display (STEP 203*h*: NO), this means that the user desires the correction for the selected original file even while the corrected image file is displayed. Accordingly, the user is notified that the corrected image file is already displayed (STEP 203*k*). Subsequently, the single-piece image information correction operation is terminated, and then a determination is made as to whether to cancel the image file correction as shown in FIG. 13 (STEP 204).

If there is no corrected image file corresponding to the original image file selected in STEP 203*a* (STEP 203*b*: NO), the image restoration filter is obtained to correct the original image file (STEP 203*c*). During this correction, the blurring information piece is read to the image restoration filter generator in FIG. 1, and the image restoration filter is generated. Instead, if the blurring information piece includes the image restoration filter, the filter is directly used.

After that, the correction processing for the original image file is performed by use of the image restoration filter obtained in STEP 203*c* (STEP 203*d*). After the original and corrected image files are displayed, the current display mode is checked (STEP 203*f*). If the display mode is the both-version display (STEP 203*f*: NO), the image files are redisplayed (STEP 203*l*), and the single-piece image information correction operation is terminated. Subsequently, a determination is made as to whether to cancel the image file correction as shown in FIG. 13 (STEP 204).

On the other hand, if the current display mode is determined as the single-version display in STEP 203*f* (STEP 203*f*: YES), the extension of the original image file is changed to TMP (STEP 203*g*), and thus is set to be hidden. Thereafter, the single-piece image information correction operation is terminated and a determination is made as to whether to cancel the image file correction as shown in FIG. 13 (STEP 204).

In the case of correcting a single image information piece as described above, if image files are arranged in descending order of the blurring amount in the initial image display, the user can easily determine which image file to select for correction.

[2-4] Image File Correction Cancellation Operation

Fourthly, the image file correction cancellation operation will be described. As shown in FIG. 13, either after the single-piece image information correction operation is performed and terminated (STEP 203: YES, C1 and C2), or when the single-piece image information correction operation is not performed (STEP 203: NO), a determination is made as to whether to perform the image file correction cancellation operation (STEP 204). Then, if the user issues an instruction to perform the image file correction cancellation operation (STEP 204: YES) the image file correction cancellation operation is performed. Here, this image file correction cancellation operation will be described in detail with reference to FIG. 17.

Figure 17:
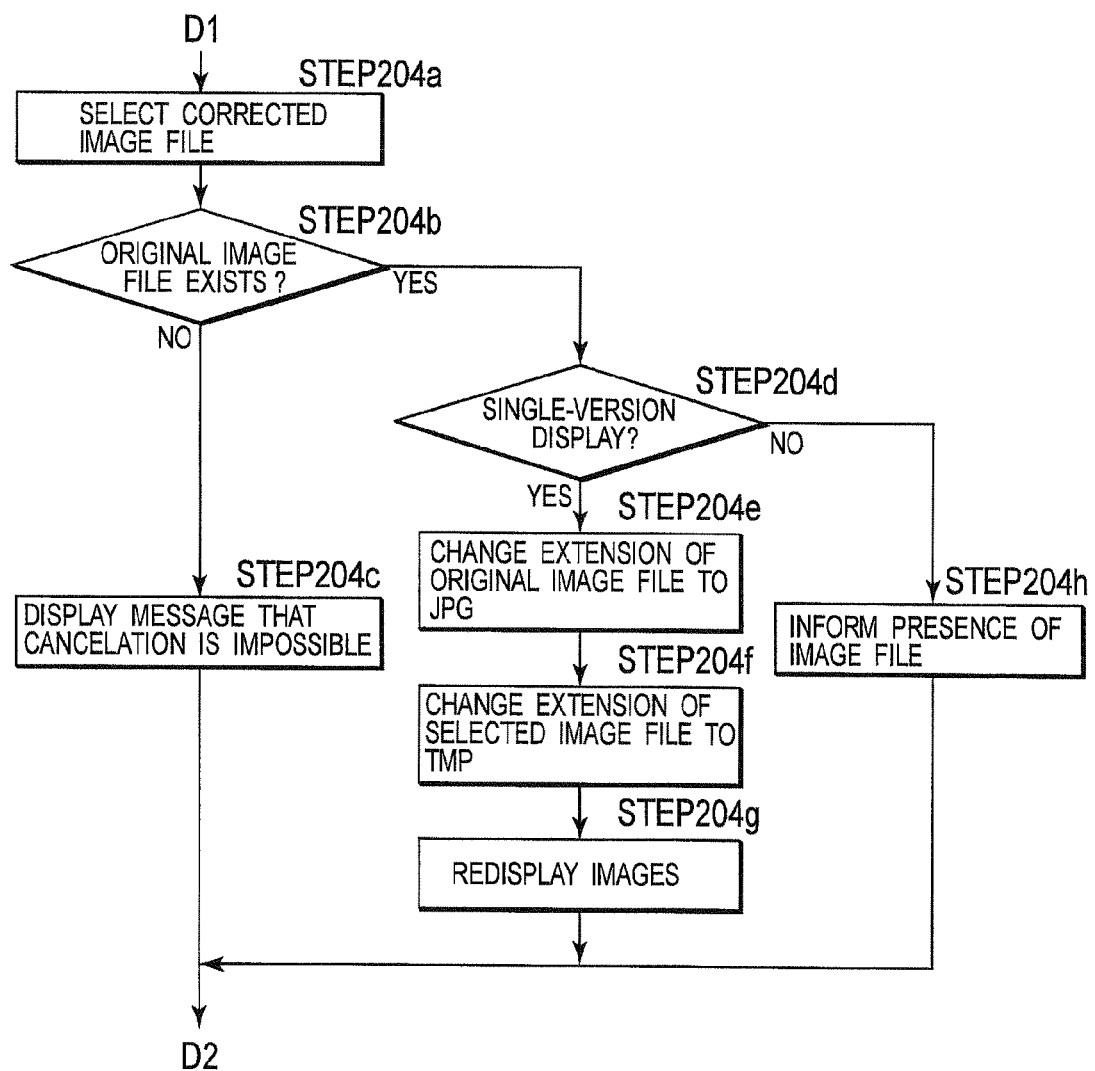
FIG. 17 is a flowchart showing an image file correction cancellation operation of the general operation.

As shown in FIG. 17, upon start of the image file correction cancellation operation, a corrected image file whose correction is to be canceled is selected (STEP 204a). Then, it is checked whether or not there is an original image file corresponding to this selected image file (STEP 204b). If the corrected image file exists (STEP 204b: YES), the current display mode is checked (STEP 204d).

If the current display mode is the single-version display (STEP 204d: YES), the original image file is not displayed, and thus the extension of the original image file is changed to JPG. Then, in order to perform the single-version display, the extension of the selected corrected image file is changed to TMP (STEP 204f) and thus is set to be hidden. Thereafter, the image files are redisplayed (STEP 204g), and the image file correction cancellation operation is terminated. Subsequently, the general operations are terminated as shown in FIG. 13, and a determination is made as to whether to perform the collective image information correction (STEP 3) as shown in FIG. 10.

Instead, if the current display mode is not the single-version display but the both-version display (STEP 204d: NO), this means that the user desires the correction cancellation even while the original image file is already displayed. Accordingly, the user is notified that the original image file is already displayed (STEP 204h). Subsequently, the image file correction cancellation operation is terminated and concurrently the general operations are terminated as shown in FIG. 13. Then a determination is made as to whether to perform the collective image information correction as shown in FIG. 10 (STEP 3).

If there is no original image file corresponding to the corrected image file selected in STEP 204a (STEP 204b: NO), the correction cannot be cancelled. Hence, the user is notified that the correction cancellation is impossible (STEP 204c). Thereafter, the image file correction cancellation operation is terminated, and concurrently the general operations are terminated as shown in FIG. 13. Then, a determination is made as to whether to perform the collective image information correction as shown in FIG. 10 (STEP 3).

In this way, if the single-version display is set to hide original image files from the display as described above, two image files of a certain image can be stored without having to be displayed together at the same time. Moreover, if the user desires to restore a corrected image file to its original image file as described above, the original image file can be displayed quickly since the original file is merely hidden.

[3] Correction-Target Image File Selection Operation

Figure 18:
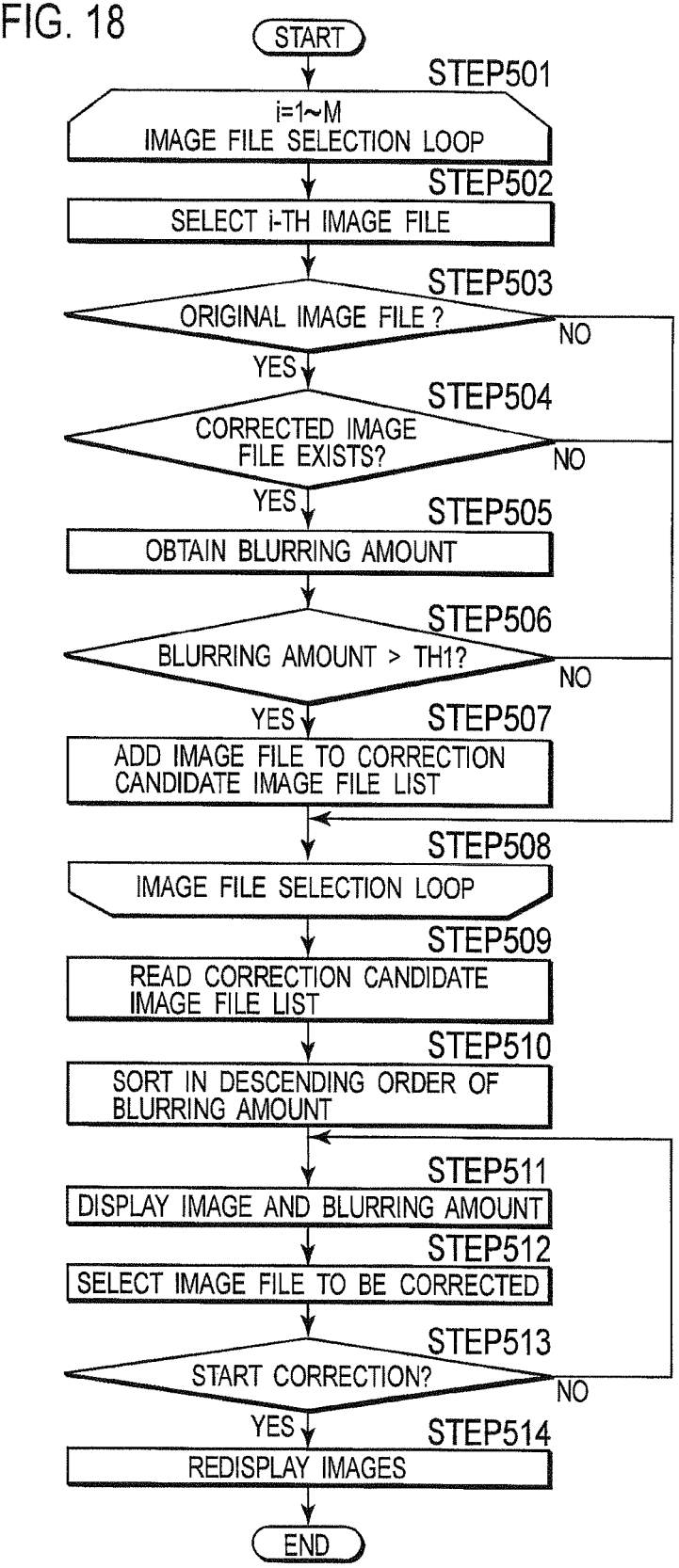
FIG. 18 is a flowchart showing a correction-target image file selection operation.

Hereinafter, the collective image information correction operation will be described. Firstly, with reference to FIG. 18, description will be provided for an image file selection operation in the collective image information correction. FIG. 18 is a flowchart showing the details of the correction-target image file selection operation (STEP 5) in FIG. 10.

As shown in FIG. 18, if the user issues an instruction to perform the collective image information correction (STEP 3: YES in FIG. 10), the image pickup apparatus firstly performs a loop operation of selecting image files (STEPs 501 to 508). This loop operation is performed for all the image files. Assuming that the total number of image files is M, this loop operation is terminated upon completion of the operation for the first to M-th image files.

Upon start of the loop operation of selecting image files (STEP 501), the first image file is selected at first, and it is checked whether the first image file is an original image file (STEP 502). If the first image file is a corrected image file (STEP 503: NO), the first image file does not need to be corrected any more. Hence, next, it is determined whether to terminate the loop operation (STEP 508).

On the other hand, if the first image file is the original image file (STEP 503: YES), then it is checked whether or not there is its corresponding corrected image file (STEP 504). If the corresponding corrected image file exists (STEP 504: NO), the image information piece of this original image file does not need to be corrected any more. Thus, next, it is determined whether to terminate the loop operation (STEP 508).

Instead, if the selected image file is an original one (STEP 503: YES), and if there is no image file corresponding to the selected image file (STEP 504: YES), then the blurring amount of the image file is obtained (STEP 505). If the obtained blurring amount is smaller than a certain value TH1 (for example, 1) (STEP 506: NO), this image file does not need to be corrected. Hence, next, it is determined whether to terminate the loop operation (STEP 508).

On the other hand, if the blurring amount is larger than the value TH1 (STEP 506: YES), the image information piece may need to be corrected. Hence, this image file is added to a list of candidates for image files to be corrected (hereinafter, referred to as a correction candidate image file list) (STEP 507). Then, it is determined whether to terminate the loop operation (STEP 508).

If it is determined in STEP 508 that the operation for the M-th corrected image file has not been performed yet, the operation returns to STEP 501 to continue this loop operation. Next, the next image file is selected (STEP 502) and the same operation as described above is performed for the selected next image file. On the other hand, if the operation for the M-th image file has already performed, the loop operation is terminated, and the correction candidate image file list is read (STEP 509). Thereafter, the image files in the correction candidate image file list are rearranged in descending order of the blurring amount (STEP 510).

Figure 19A:
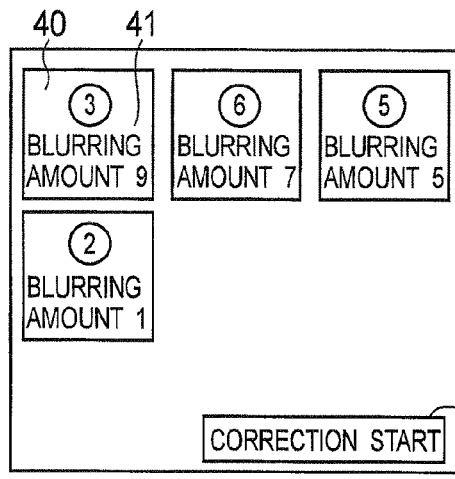
FIGS. 19A to 19E are schematic views of the display screens showing a result of image file selection and rearrangement before a correction operation.

After the image files are rearranged in descending order of the blurring amount in STEP 510, the images and blurring amounts of the respective image files are displayed (STEP 511). FIG. 19A shows a schematic view of the display screen at this time. FIG. 19A is a schematic view showing a screen in the same manner as in FIGS. 12A to 12D showing the screens of the initial image display. In FIG. 19A, the screen displays a result of selecting and rearranging image files before the correction operation. Here, a value of 1 is used to determine whether to add an image file selected in STEP 506 in FIG. 18, to the correction candidate image file list.

In this case, the fourth image file shown in FIG. 12C is not selected because it has a blurring amount of 0, and the first image file is also not selected because its corresponding corrected image file already exists. Accordingly, in FIG. 19A, only thumbnail images 40 of the four files other than the above first and fourth image files are displayed. In addition, the image files are rearranged and displayed in descending order of the blurring amount 41 from the upper-left side to the lower-right side of the screen.

FIG. 19A shows the thumbnail images 40 of the original image files, all of which do not have their respective corrected image files. For this reason, no matter which one of the both-version display and the single-version display is set as the display mode, the image files are displayed in the same manner as shown in FIG. 19A.

With the screen thus displayed, the user selects an image files to be corrected (STEP 512). After the selection, the user determines whether to start the correction of the image files (STEP 513). If the user issues an instruction to start the correction by selecting a correction start button 43 in FIG. 19A or by performing another similar operation (STEP 513: YES), the image files selected in STEP 512 are redisplayed (STEP 514) and concurrently the correction-target image file selection is terminated to perform the collective image information correction shown as STEP 6 in FIG. 10. On the other hand, if the user does not issue the instruction to start the correction (STEP 513: NO), the image files and the blurring amounts are again displayed (STEP 511), thereby allowing the user to further select image files to be corrected (STEP 512).

At this time, the user can select two or more image files, and alternatively can select only one image file. Since the image files are rearranged and displayed in descending order of the blurring amount as described above, the user can determine whether to correct images one by one in descending or ascending order of the blurring amount when selecting image files to be corrected. Accordingly, while sequentially checking the images of the rearranged image files, the user can easily select the image files to be corrected by simply determining a certain image file to instruct that the image files preceding or following the certain image file should be corrected. Thus, such image file display reduces a time required for selection and facilitates the selection. Moreover, this image file display can prevent the user from failing to select, through oversight, all the image files to be corrected.

Moreover, when image files have the blurring amount below the value TH1 or have corresponding corrected image files, these image files are not added to the correction candidate image file list, and thus are not displayed in the selection screen as shown in FIG. 19A. Accordingly, most of the image files displayed on this screen need to be corrected. This even more helps the user to easily select image files to be corrected.

Note that the image pickup apparatus may be configured to allow the user to select, as image files to be corrected, all the image files each having the blurring amount exceeding a certain value. If the image pickup apparatus employs such a configuration, the selection screen shown in FIG. 19A may be configured to allow the user to select a border line between a group of image files to be corrected and a group of image files not to be corrected, or to select a certain image file to designate as the correction-target image files all the image files each having a larger blurring amount than that of the certain image file.

Moreover, the value TH1 may be set by the user. Under such setting, the correction candidate image file list includes image files most of which are to be selected and corrected. Thus, the user can much more easily select image files to be corrected. In addition, letting the user set the value TH1, the image pickup apparatus may automatically select all the image files included in the correction candidate image file list to be corrected.

In the above description, the images of image files selected to be corrected are redisplayed in STEP 514. However, the images of the image files may not be redisplayed in STEP 514, but the image files may be redisplayed when being actually corrected. In addition, although FIG. 19A shows the thumbnail images 40 of the image files with the blurring amounts 41 attached thereto, the thumbnail images 40 may be displayed without the blurring amounts 41. Alternatively, instead of the thumbnail images 40, only one large image of an image file may be displayed.

[4] Collective Image Information Correction Operation

Figure 20:
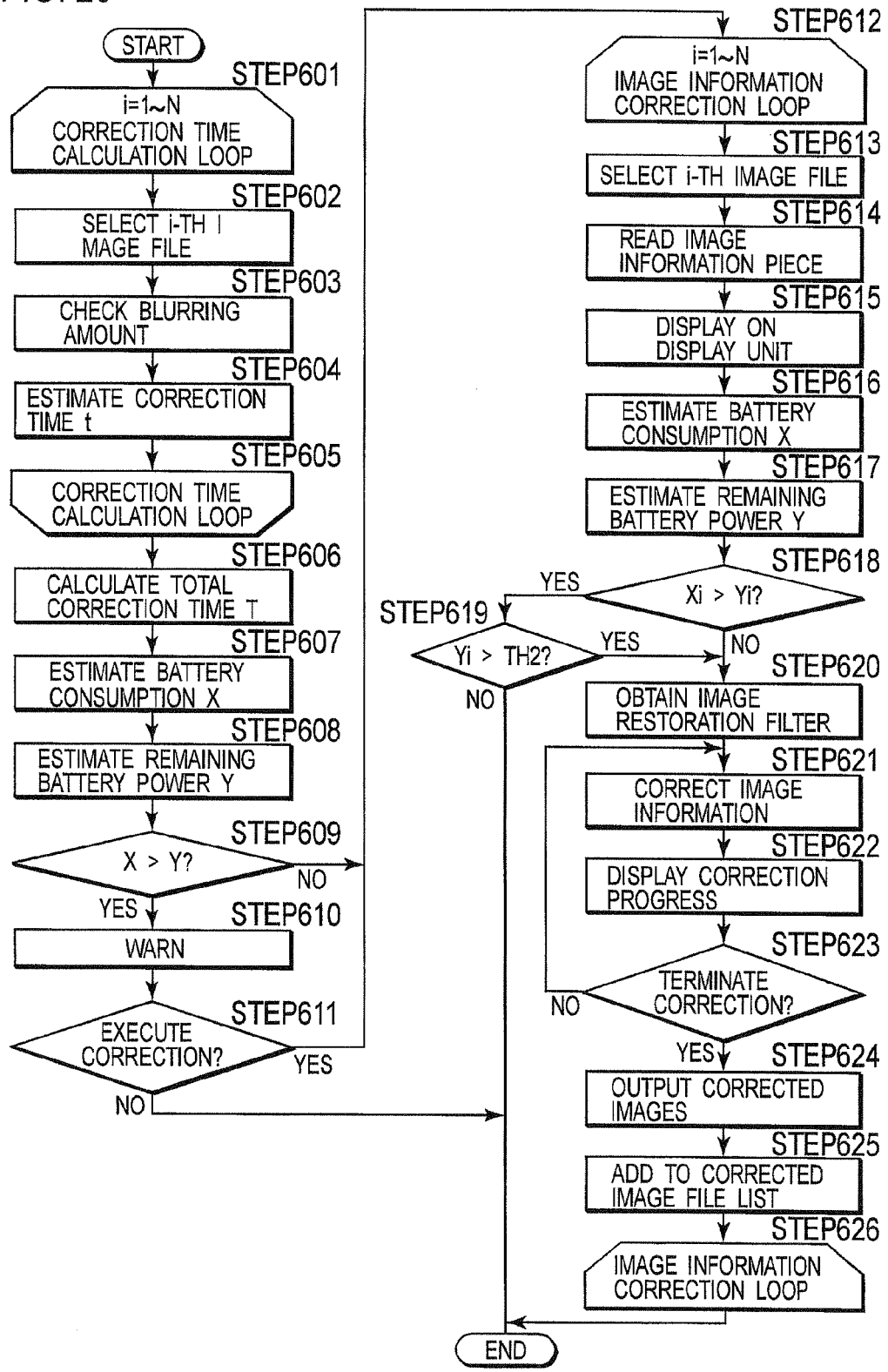
FIG. 20 is a flowchart showing a collective image information correction operation.

With reference to FIG. 20, descriptions will be provided for the case where the image information pieces of image files selected in the [3] correction-target image file selection operation are corrected through the collective image information correction. FIG. 20 is a flowchart showing the collective image information correction operation.

As shown in FIG. 20, upon start of the collective image information correction operation, a correction time calculation loop operation is firstly carried out to calculate a total correction time T required to correct the image information pieces of all the selected image files (STEPs 601 to 606). This loop operation is performed for all the image files selected in the [3] correction-target image file selection operation. Assuming that the total number of selected image files is N, the loop operation is terminated upon completion of the operation for the first to N-th image files.

Upon start of the correction time calculation loop operation (STEP 601), the image information piece of the first file is read (STEP 602) and the blurring amount corresponding to the read image information piece is checked (STEP 603). Then, a correction time t is calculated based on this blurring amount and temporarily stored in a memory or the like (STEP 604). Thereafter, it is determined whether to terminate the loop operation (STEP 605).

If the operation for the N-th image file has not been performed yet in STEP 605, the operation returns to STEP 601 to continue this loop operation. Next, the next image file is selected (STEP 602) and the same operation as described above is performed for the selected next image file. If the operation for the N-th image file has been performed, this correction time calculation loop operation is terminated. Note that the calculation of the correction time t in STEP 604 will be described in detail later.

After the correction times t of the respective image files are calculated in the correction time calculation loop operation, the total correction time T is calculated by adding up the correction times t (STEP 606). Then, a battery consumption X is estimated based on the total correction time T (STEP 607), and an available remaining battery power Y is obtained (STEP 608). The method of calculating the battery consumption X in STEP 607 will be described together with the method of calculating the correction time t.

Next, the battery consumption X estimated in STEP 607 and the remaining battery power Y obtained in STEP 608 are compared with each other (STEP 609). If the estimated battery consumption X is lower than the remaining battery power Y (STEP 609: NO), the battery power is less likely to be exhausted during the correction operation. Accordingly, the operation proceeds to an image information correction loop operation (STEPs 612 to 626).

On the other hand, when the estimated battery consumption X is larger than the remaining battery power Y (STEP 609: YES), the battery power is likely to be exhausted during the correction operation and the correction operation is likely to halt. Accordingly, in this case, before starting the correction operation, the image pickup apparatus warns the user (STEP 610) to let the user to determine whether to execute the correction (STEP 611). If the user inputs an instruction not to execute the correction (STEP 611: NO), the collective image information correction operation is terminated without any correction. Instead, if the user inputs an instruction to execute the correction (STEP 611: YES), the operation proceeds to the information correction loop operation (STEPs 611 to 620).

This image information correction loop operation is performed for all the image files selected in the [3] correction-target image file selection operation as similar to the correction time calculation loop operation in STEPs 601 to 605. Assuming that the total number of selected image files is N like the correction time calculation loop operation in STEPs 601 to 605, the loop operation is terminated upon completion of the operation for the first to N-th image files. Note that this loop operation is also terminated even halfway, if the remaining battery power $Y_i$ becomes low.

Upon start of the image information correction loop operation (STEP 612), the first image file is selected (STEP 613) and the image information piece thereof is read to the image information memory 32 shown in FIG. 9 (STEP 614). Then, the remaining correction time T1 required processing all the rest of the image information pieces is calculated by use of the correction times t calculated and temporarily stored in STEP 604. The calculated remaining correction time T1 is displayed on the display unit 4 shown in FIG. 1 (STEP 615).

Figure 19B:
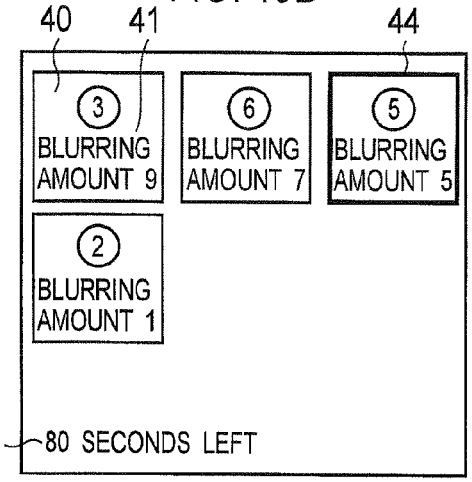
Figure 19C:
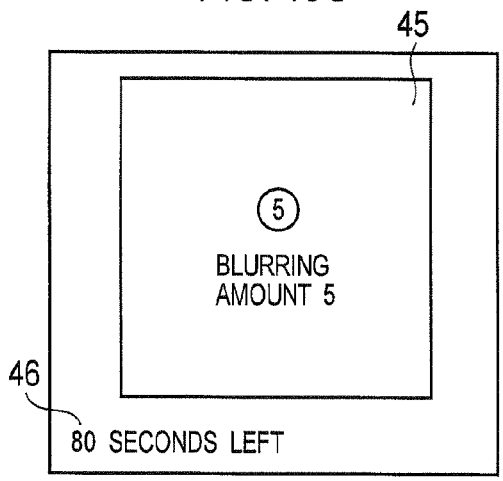

FIGS. 19B and 19C show schematic views of screens displayed on the display unit 4 in STEP 615. FIG. 19B shows the screen displaying thumbnail images 40 as the images of image files. In FIG. 19B, a marker 44 is added to a thumbnail image 40 representing an image file to be corrected next. FIG. 19C shows the screen displaying an image 45 by reading the image information piece, which is about to be corrected, from the image information memory. Then, in either display mode, an image 46 representing the remaining correction time $T_i$ (a part showing "80 seconds left" in the drawings) is displayed. Here, the remaining correction time T1 denotes an estimated time required to correct all the i-th and subsequent image information pieces. Incidentally, these display modes shown in FIGS. 19B and 19C are merely examples, and the image files may be displayed in any display mode. For example, a motion vector as shown in FIGS. 4 and 5, or a PSF as shown in FIG. 6 may be displayed on the image of the i-th image information piece to be corrected next, or may be displayed next to the image of the i-th image information piece.

Then, after the image 45, the marker 44 and the remaining correction time T1 of the image information pieces to be corrected in STEP 615 are displayed, the battery consumption $X_i$ to be used for the entire correction operation for the i-th and subsequent image information pieces is estimated based on the remaining correction time $T_i$ (STEP 616). After that, the remaining battery power $Y_i$ is obtained (STEP 617) and is compared with the estimated battery consumption $X_i$ as in aforementioned STEP 609 (STEP 618).

If the estimated battery consumption $X_i$ is lower than the remaining battery power $Y_i$ (STEP 618: NO), the battery power is less likely to be exhausted during the correction operation. Accordingly, the correction operation is performed (STEPs 620 to 623). On the other hand, if the estimated battery consumption $X_i$ is larger than the remaining battery power $Y_i$ (STEP 618: YES), then the remaining battery power $Y_i$ is checked to determine if $Y_i$ is larger than a certain value TH2 (STEP 619). This value TH2 is a value on the order of battery power that allows sufficient battery power to remain even after the execution of correction one more time.

If the remaining battery power $Y_i$ is larger than the value TH2 (STEP 619: YES), the correction operation can be performed at least one more time. Thus, the correction operation is performed (STEPs 620 to 623). On the other hand, if the remaining battery power $Y_i$ is smaller than the value TH2 (STEP 619: NO), the battery power is likely to be exhausted during the one-time correction operation. Accordingly, the collective image information correction operation is terminated without correcting the rest of the image information pieces.

Subsequently, upon start of the correction operation after the remaining battery power is determined as sufficient in STEPs 618 and 619, an image restoration filter is obtained at first (STEP 620). At this time, the blurring information piece is read to the blurring information memory 33 in FIG. 9, and concurrently the image restoration filter is generated by the blurring information computational circuit 34. The generated image restoration filter is temporarily stored in the image restoration filter memory 35, and then is read to and set in the image information correction circuit 36. When the blurring information piece includes the image restoration filter, the image restoration filter can be set in the image information correction circuit 36 while the calculation of the blurring information computational circuit 34 is skipped. By using the image restoration filter obtained in STEP 620, the image information correction circuit 36 corrects the image information piece (STEP 621). Additionally, a progress screen to be described below is displayed during the correction (STEP 622).

Figure 19D:
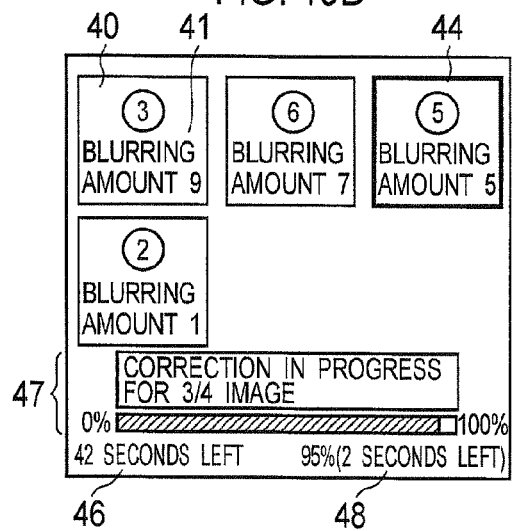

FIG. 19D shows a schematic view of an example of a screen displayed on the display unit 4 in STEP 622. FIG. 19D shows the screen displaying the thumbnail images 40 as the images of image information pieces to be corrected. As shown in FIG. 19D, for instance, the screen may display: a graph 47 (a part displayed in a lower portion of FIG. 19D including a bar part, the below part showing 95% and the above part showing "correction in progress for ¾ image") indicating the progress of correction; an image 48 (apart showing "2 seconds left" below the graph) indicating a time required until the completion of the correction of the image information; and an image 46 (a left part showing "42 seconds left" below the graph) indicating a time required until the completion of the correction of all the rest of the image information pieces.

Until it is confirmed that the correction for the i-th image information piece is completed (STEP 623: NO), the image information correction in STEP 621 and the progress screen display in STEP 622 are iteratively executed. Upon confirmation that the correction is completed (STEP 623: YES), the corrected image files are outputted to and temporarily stored in the corrected image file memory 37 shown in FIG. 9 (STEP 624). At this time, the extensions of the corrected image files are set to JPG. Thus, the corrected image files are set to be displayed in the correction result display operation shown in STEP 7 in FIG. 10. Then, the corrected image files are transmitted to the storage unit 31 from the corrected image file memory 37, and then are stored in the storage unit 31.

After being outputted in STEP 624, the corrected image files are added to a corrected image file list (STEP 625), and it is determined whether to terminate the correction loop operation (STEP 626). If the image information piece of the N-th image file has not been corrected yet in STEP 626, the operation returns to STEP 612 to continue the loop operation, and then the same correction operation (from STEP 613) as described above is again performed for the next selected image file. On the other hand, if the correction has been made for the N-th image file, the loop operation is terminated. Thus, the collective image information correction operation is terminated and concurrently the correction result display operation shown in STEP 7 in FIG. 10 is performed.

In this way, the battery consumptions X and $X_i$ and the remaining battery powers Y and $Y_i$ are compared with each other, before and during the execution of the correction operation as shown in STEP 609 and STEP 619 of FIG. 20. This prevents the battery power from being exhausted during the correction operation for an image information piece, thereby avoiding image file corruption. In addition, similarly, this prevents the user from failing to know how many image files have been already corrected. In the case of the execution of the collective image information correction operation, particularly, the battery power is highly likely to be exhausted during the correction operation since the correction operation is carried out multiple times for multiple image files. Because of this, if the image pickup apparatus is not configured to terminate the collective correction operation between two times of the intermittently-executed operation, by managing the battery power in the aforementioned manner, the battery power is highly likely to be exhausted during the collective correction operation as compared with during the usual correction operation in which the image information piece of a single image file is corrected in one-time execution.

In the case where the motion vector, the PSF or the image restoration filter is provided as the blurring information piece, the image restoration filter can be obtained more quickly than in the case where the image restoration filter is obtained by the conversion from the camera shake signal. Thus, the time required for the correction processing can be reduced.

The collective image information correction operation keeps the user waiting for a long time until its completion because multiple image information pieces are sequentially corrected in the collective correction operation. However, the display indicating the remaining time as shown in FIGS. 19B to 19D can make the user get relief from stress.

Incidentally, in FIG. 19, the image information pieces of image files are processed for correction in descending order of the blurring amount, but may be processed in ascending order of the blurring amount. Instead, the user may select the image files to determine the order of processing the image information pieces for correction. Additionally, in STEP 505 in FIG. 18, the blurring amounts are read to select and rearrange the image files. The blurring amounts thus read may be stored in a memory or the like, and then used to obtain the blurring amounts in STEP 603 in FIG. 19. This configuration leads to a reduction of a time for calculating the blurring amount in STEP 603. Moreover, when the blurring amount is made ready to use by being included in the header information of an image file, the time for calculating the blurring amount is reduced. As a result, the time for rearrangement and correction can be reduced and the speed to calculate the battery consumption can be made faster.

Hereinafter, the method of calculating the estimated correction time in STEP 604 will be described. Here, the correction time t is assumed as the sum of a time $t_1$ required to generate an image restoration filter from blurring information piece, and a time $t_2$ required to perform the correction processing on an image information piece. The time $t_1$ for generating an image restoration filter takes an almost constant value (for example, 1 second) almost independently of the blurring amount, while the time $t_2$ for performing the correction processing on an image information piece varies depending on the blurring amount. However, since the motion vector, the PSF or the image restoration filter, for example, can be used as the blurring information piece as described above, the time $t_1$ for generating an image restoration filter varies depending on the types of the information included as the blurring information piece in image files.

Next, the method of calculating the time $t_2$ for performing correction processing on an image information piece will be described. Here, assume that: $w_{flt}$ and $h_{flt}$ respectively denote the horizontal size and vertical size of the image restoration filter in pixel unit; W and H respectively denote the horizontal size and vertical size of an image information piece in pixel unit; and Spec denotes a time required to process a command such as one addition or one multiplication by the image pickup apparatus that performs the correction processing. Under this assumption, the number of pixels of an image information piece is W×H and the number of pixels of the filter coefficients is $w_{flt} \times h_{flt}$.

As described in FIG. 5, the image information correction using the image restoration filter is carried out by performing the multiply-accumulate operation while targeting each pixel in an image information piece. In the image information correction, as shown in the example in FIG. 5, each of the pixels of the image restoration filter is multiplied by a corresponding one of a target pixel and its adjacent pixels of the image information piece. Thus, the number of multiplication operations is $w_{flt} \times h_{flt}$ that is equal to the number of pixels of the image restoration filter.

The number of values obtained by these multiplication operations is $w_{flt} \times h_{flt}$, and the sum of these values is calculated by adding up the values one by one. Accordingly, the number of addition operations is $w_{flt} \times h_{flt} - 1$ that is smaller by one than the number of values obtained through the multiplication operations. As a result, the total number of multiplication and addition operations is $2w_{flt} \times h_{flt} - 1$. Thus, the operation time for a single target pixel in an image information piece is estimated as $(2w_{flt} \times h_{flt} - 1) \times \text{Spec}$. Then, taking it into account that all the pixels in the image information piece must be targeted one by one for the correction processing, the time $t_2$ for performing the correction processing on an image information piece is figured out as $W \times H \times (2w_{flt} \times h_{flt} - 1) \times \text{Spec}$.

However, if the image restoration filter is calculated from the blurring information piece in order to calculate the time for performing the correction processing, this calculation requires a very long time since the time for calculating the image restoration filter from the blurring information piece, i.e., $t_1$, must be calculated as many times as the number of image information pieces to be corrected. For this reason, here, the time $t_2$ is calculated with a method using the horizontal size $w_{blr}$ and vertical size $h_{blr}$ of blurring. To add more information, the horizontal size $w_{blr}$ and vertical size $h_{blr}$ of blurring are respectively equivalent to the horizontal length w and the vertical length h of the circumscribed rectangular generated around the PSF to obtain the blurring amount L in FIG. 8. These blurring sizes may also be obtained based on the motion vector. Instead, when the image restoration filter is provided as the blurring information piece, the aforementioned expression, $W \times H \times (2w_{flt} \times h_{flt} - 1) \times_{Spec}$, may be used since the number of pixels of the filter coefficients can be directly substituted into the expression $w_{flt} \times h_{flt}$.

Here, the sizes of the image restoration filter are almost proportional to the blurring sizes. For this reason, letting k (for example, 3) be a proportional constant, the time $t_2$ for performing the correction processing on an image information piece is estimated as $W \times H \times (2 \, kw_{blr} \times h_{blr} - 1) \times \text{Spec}$. Then, the correction time t for a single image information piece is expressed as $t_1 + W \times H \times (2kw_{blr} \times h_{blr} - 1) \times \text{Spec}$. Based on this, the correction times t for all the image information pieces are summed up to estimate the total correction time T. When the correction time t and the total correction time T are calculated in the foregoing manner, the correction time t can be estimated from the motion vector or PSF without needing the calculation of the image restoration filter. Consequently, the time for obtaining the correction time t and the total correction time T can be reduced.

Instead of using the horizontal size $w_{blr}$ and vertical size $h_{blr}$ of blurring, the blurring amount L can be used to estimate the correction time t. In this case, letting q be a proportional constant, the correction time t for an image information piece is estimated as $t_1+W \times H \times (2qL-1) \times Spec$. The correction time t thus estimated is not as accurate as the correction time t estimated using the horizontal size $w_{blr}$ and vertical size $h_{blr}$ of blurring. However, when the blurring amount L is stored in the memory or included in the image file in advance, the correction time t can be estimated instantaneously by using the blurring amount L. Note that the blurring amount L may be set as the product of horizontal size and vertical size of the circumscribed rectangular of the PSF, that is, w×h, instead of the length of the diagonal line of the circumscribed rectangular of the PSF, that is, $(w^2+k^2)^{1/2}$. Hence, the image files may be rearranged and the correction times t may be calculated in the foregoing manners by using the blurring amount L of w×h.

Next, the calculation method of estimating the battery consumption X from the total correction time T will be described. Here, assume that: E denotes a battery consumption per operating time of a circuit configured to generate the image restoration filter from the blurring information piece; F denotes a battery consumption per operating time of a circuit configured to correct the image information piece; and G denotes a battery consumption per operating time of the other circuits. The other circuits, here, are circuits provided in the display unit, the controller, the storage unit and the like, and operating during the correction processing.

BY using the time $t_1$ for generating an image restoration filter, and the time $t_2$ for performing correction processing on an image information piece, an estimated battery consumption for an single image information piece is expressed as $E \times t_1 + F \times t_2 + G \times (t_1+t_2)$. The battery consumptions thus estimated for all the image information pieces to be corrected are summed up as E×(the sum of $t_1$ of all the image information pieces)+F×(the sum of $t_2$ of all the image information pieces)+G×(the total correction time T). The value thus obtained is the battery consumption X. With a constant used as $t_1$, (the sum of $t_1$ of all the image information pieces) may be calculated as ($t_1$×the total number of image information pieces to be corrected).

Similarly, the battery consumption $X_i$ in Step 616 in FIG. 20 can be calculated by changing the total operating time. In STEP 616, the first to i−1-th image information pieces have been corrected, and thus the rest thereof includes the i-th to N-th image information pieces. Accordingly, the battery power to correct the i-th to N-th image information pieces is needed. Thus, the battery consumption $X_i$ is equal to E×(the sum of $t_1$ of the i-th to N-th image information pieces)+F×(the sum of $t_2$ of the i-th to N-th image information pieces)+G×(the remaining correction time $T_i$). Here, the remaining correction time $T_i$ is the total sum of the sum of $t_1$ of the i-th to N-th image information pieces, and the sum of $t_2$ of the i-th to N-th image information pieces. In addition, with a constant used as $t_1$, (the sum of $t_1$ of the i-th to N-th image information pieces) may be calculated as ($t_1$×(N−i+1)).

[5] Correction Result Display Operation

Figure 21:
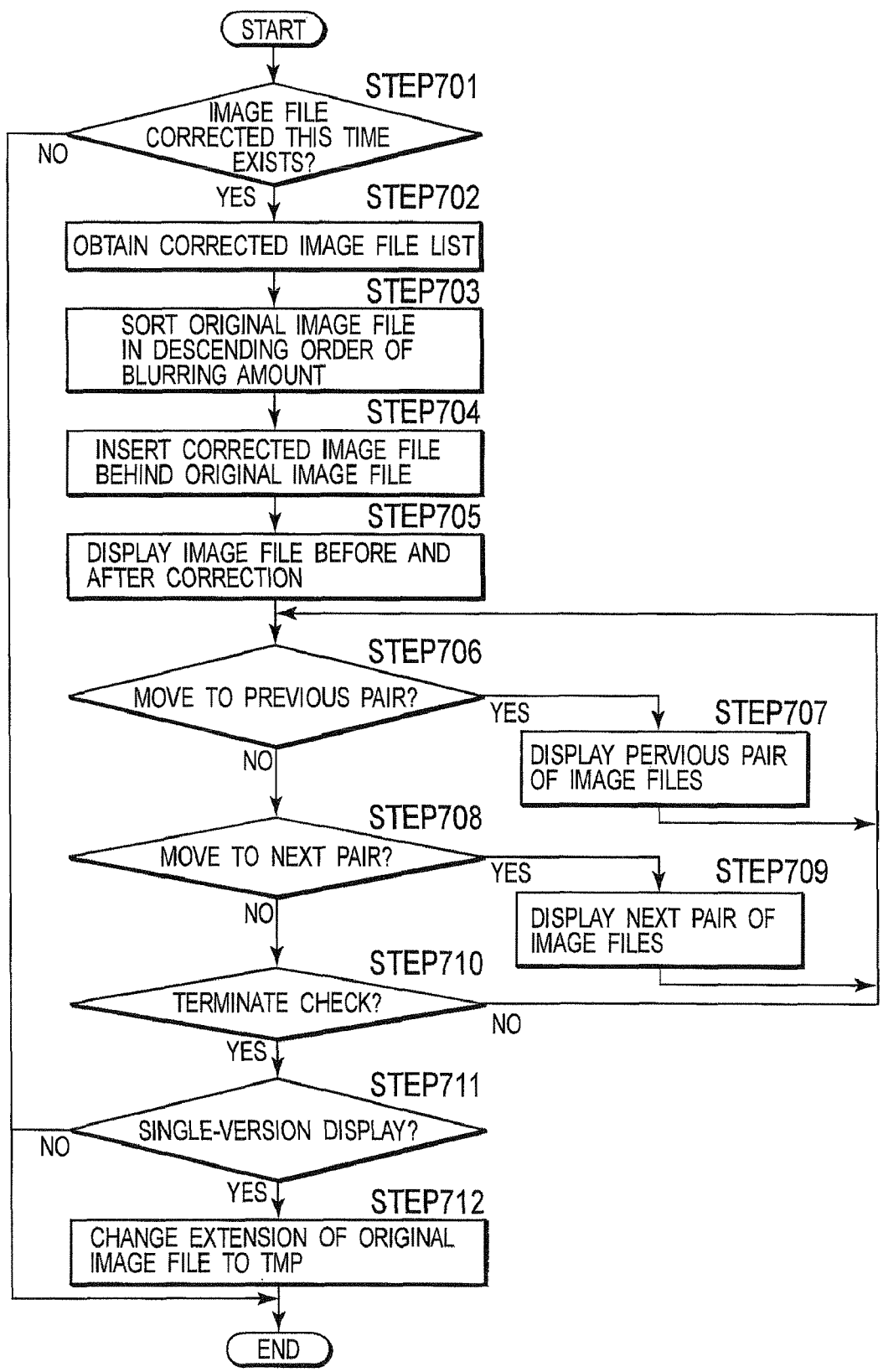
FIG. 21 is a flowchart showing a correction result display operation.

With reference to FIG. 21, descriptions will be provided for the method of checking original and corrected image files obtained by the [3] collective image information correction operation. FIG. 21 is a flowchart showing the correction result display operation.

As shown in FIG. 21, upon start of the correction result display operation, it is checked first whether or not there is an image file corrected at this time (STEP 701). If there is no image file corrected in the current operation because the correction is cancelled due to low battery power or the like (STEP 701: NO), the correction result display operation is terminated without any processing. On the other hand, if there is an image file corrected at this time, the corrected image file list generated in STEP 624 in FIG. 20 is obtained (STEP 702).

Thus, the image files corrected at this time are identified in STEP 702, and their corresponding original image files are rearranged in descending order of the blurring amount (STEP 703). Then, the corrected image files are inserted behind their respective original image files thus rearranged (STEP 704). The operation in the STEPs 703 and 704 is the same as the corrected image file insertion loop operation shown in STEP 107 to STEP 111 in FIG. 11 in the initial image display operation. Thus, the detailed description is omitted here.

Then, a pair of the original image file and the corrected image file thus rearranged are displayed to let the user make a check (STEP 705). If the user issues an instruction to go back to the preceding pair (STEP 706: YES), the preceding pair of image files are displayed (STEP 707). Instead, if the user issues an instruction to proceed to the subsequent pair (STEP 708: YES) instead of the instruction to go back to the preceding pair (STEP 706: NO), the subsequent pair of image files are displayed (STEP 709). Then, this image file checking operation is iteratively executed (STEP 710: NO) until the user issues an instruction to terminate the checking.

Figure 19E:
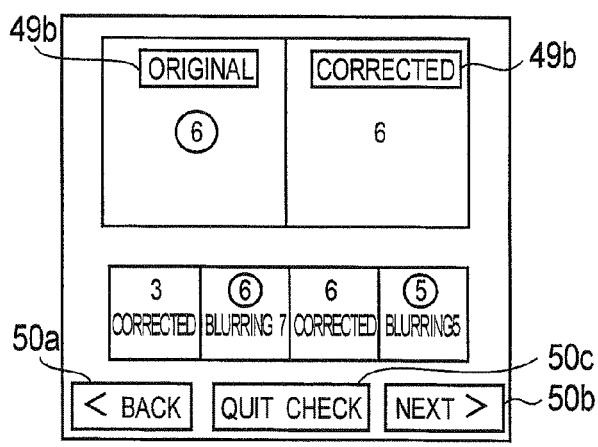

FIG. 19E shows a schematic view indicating an example of a screen displayed in STEPs 705 to 710 on the display unit 4. As shown in FIG. 19E, an image 49a of an original image file and an image 49b of the corresponding corrected image file are adjacently displayed so as to be compared with each other. In addition, a "back" button 50a and a "next" button 50b are displayed and used to display the images of the preceding pair of image files and the images of the subsequent pair of image files, respectively. Then, the user issues an instruction to terminate the checking by selecting a "quit check" button 50c (STEP 710: YES).

If the user issues the instruction to terminate the checking in STEP 710, then the display mode is checked (STEP 711). If the display mode is the single-version display (STEP 711: YES), the extensions of the original image files corrected at this time are changed from JPG to TMP to hide the original image files (STEP 712), and then the correction result display operation is terminated. On the other hand, if the display mode is not the single-version display but the both-version display (STEP 711: NO), the correction result display operation is terminated without changing the extensions of the original image files from JPG. Thereafter, upon completion of the correction result display operation, it is determined in STEP 4 in FIG. 10 whether to terminate the whole operation of the image pickup apparatus.

By comparing and checking the images of original and corrected image files in this manner after the collective image information correction operation, the user can easily know the effect of the correction. In addition, at this time, since the images of the image files are rearranged in descending order of the blurring amount, the images of the image files are displayed in the same order as that of the images of the image files displayed before the correction. Accordingly, even when a large number of pairs of image files are displayed after a large number of image information pieces of image files are corrected, the user can easily find an image file that the user desires to check.

In addition, in aforementioned Example 1, the image pickup apparatus is configured to correct multiple image information pieces collectively, and to display image files by rearranging or selecting image files according to the blurring amount. Thus, only image files to be corrected can be arranged in descending order, which can reduce a time and effort required by a user to select image files to be corrected.

Further, since the motion vector, the PSF or the image restoration filter is used as the blurring information piece to generate the image restoration filter, the blurring information piece can be converted into the image restoration filter more quickly than that in the case where the camera shake signal is used as the blurring information piece. As a result, the time required for the conversion to the image restoration filter can be reduced. Moreover, since the motion vector, the PSF or the image restoration filter has a smaller data amount than the camera shake signal, the total data amount can be reduced as well as the blur correction processing at higher speed can be achieved.

Additionally, the time required for the correction is estimated and displayed to the user. This can make the user get relief from stress even when the correction takes a certain length of time in the collective image information correction operation. The estimated time is also used to estimate the battery consumption. Thus, before the execution of the collective image information correction operation with high power consumption, the user can be warned that the battery power is likely to be exhausted. In addition, the battery power is checked before the correction of each image information piece, which prevents the exhaustion of the battery power during the correction. This also avoids image file corruption and prevents a user from failing to know how many image files have been corrected.

Heretofore, the descriptions have been provided for the case where the collective image information correction method is applied to the blur correction device using the image restoration-based correction method. However, the collective image information correction method of Example 1 can be applied to a blur correction device using the electronic correction method that is capable of analyzing and correcting image information pieces after shooting as is the case with the image restoration-based correction method.

In the case where the collective image information correction method of Example 1 is applied to the blur correction device using the electronic correction method, image information pieces after the shooting is analyzed to obtain the blurring amounts, and blurring information pieces like the above are obtained from the blurring amounts. Then, the image files are rearranged and the images of the rearranged image files are displayed to a user. With this configuration, the blur correction device using the electronic correction method allows the user to easily select image files to be corrected, and achieves the correction operation at higher speed. Moreover, an image pickup apparatus including the blur correction device using the electronic correction method does not need a sensor and the like such as an angular velocity sensor, so that the image pickup apparatus can be downsized more.

Furthermore, the electronic apparatus including the blur correction device of this embodiment is not limited to the foregoing image pickup apparatus. In fact, the blur correction device of this embodiment is also employable in a display that displays an image by correcting an inputted image file, a printer that prints an image by correcting an inputted image file, or the like.

Example 2

In foregoing Example 1, the correction processing can be speeded up by performing the collective image information correction while rearranging image files according to the blurring amount, and by using the motion vector, the PSF or the image restoration filter as the blurring information piece. However, the correction operation can be further speeded up by employing a configuration like Example 2 described below.

Figure 22A:
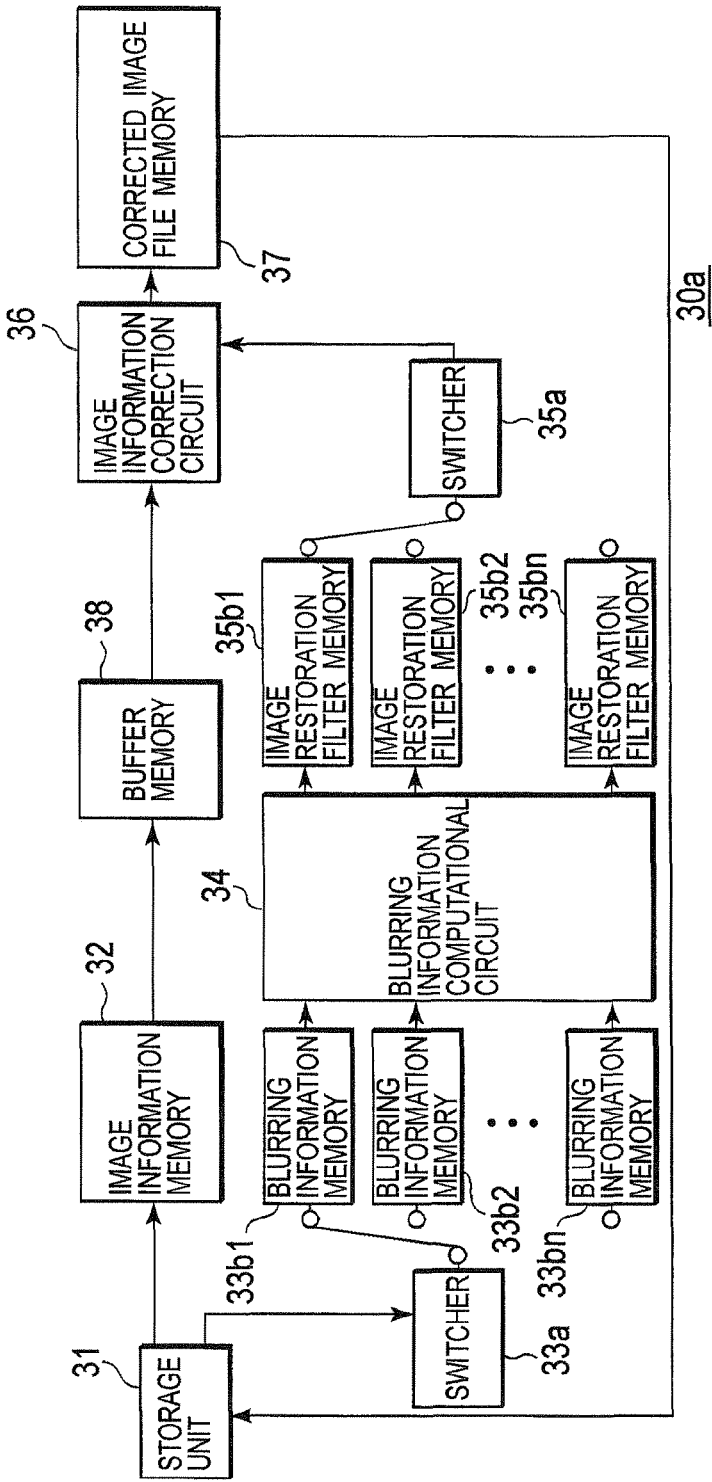
FIGS. 22A and 22B are a block diagram showing a configuration of a blur correction device in Example 2, and a schematic diagram showing the outline of operations.
Figure 22B:
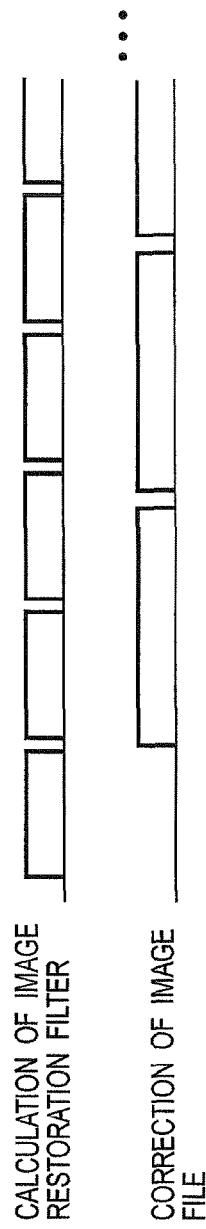

With reference to FIGS. 22A and 22B, descriptions will be provided for a configuration and operations of a blur correction device in Example 2. FIG. 22A is a block diagram showing the configuration of the blur correction device, and corresponds to FIG. 9A for Example 1. FIG. 22B is a conceptual diagram schematically showing timings in the correction operations in the blur correction device in Example 2, and corresponds to FIG. 9B for Example 1. In FIG. 22A, the same reference numerals are given to the same components as those in FIG. 9A, and the detailed descriptions thereof are omitted here.

As shown in FIG. 22A, a blur correction device 30*a* in Example 2 includes: a storage unit 31 configured to store image files each including an image information piece and a blurring information piece; an image information memory 32 configured to temporarily store the image information piece read from the storage unit 31; a buffer memory 38 configured to temporarily store the image information piece read from the image information memory 32 to perform the correction processing; blurring information memories 33*b*1 to 33*bn* each configured to temporarily store a blurring information piece; a blurring information computational circuit 34 configured to generate an image restoration filter from a blurring information piece and to output the image restoration filter; image restoration filter memories 35*b*1 to 35*bn* each configured to temporarily store the image restoration filter outputted from the blurring information computational circuit 34; an image information correction circuit 36 configured to correct image information with the image restoration filter to generate a corrected image file; and a corrected image file memory 37 configured to receive an output of the corrected image file and to temporarily store the corrected image file.

The blur correction device 30*a* in Example 2 has a configuration provided with multiple blurring information memories 33*b*1 to 33*bn* and multiple image restoration filter memories 35*b*1 to 35*bn*. The blurring information memories 33*b*1 to 33*bn* correspond to the respective image restoration filter memories 35*b*1 to 35*bn*, and thus the number of memories 33*b*1 to 33*bn* is equal to the number of memories 35*b*1 to 35*bn*. Moreover, the blur correction device 30*a* includes: a switch 33*a* configured to select one of the blurring information memories 33*b*1 to 33*bn* and to give the selected blurring information memory the blurring information read from the storage unit 31; and a switch 35*a* configured to select one of the image restoration filter memories 35*b*1 to 35*bn*, and to read an image restoration filter to give the image information correction circuit 36 the image restoration filter.

Next, by using FIG. 22B in addition to FIG. 22A, descriptions will be given for an outline of a collective image information correction operation in the blur correction device 30*a* in Example 2. To begin with, once the collective image information correction operation starts, the image information of a first image file stored in the storage unit 31 is read to the image information memory 32, and concurrently the blurring information thereof is read to the blurring information memory 33*b*1 through the switch 33*a*. Then, the blurring information is read to the blurring information computational circuit 34 and then is calculated in the foregoing manner to obtain the image restoration filter eventually. The generated image restoration filer is outputted to the image restoration filter memory 35*b*1 that corresponds to the blurring information memory 33b1 having received the blurring information used to generate this image restoration filter. Then, the image restoration filter memory 35b1 temporarily stores the image restoration filter.

After that, the image restoration filter corresponding to the image information of the first image file is set in the image information correction circuit 36, the first image information is read to the buffer memory 38 and is concurrently read to the image information correction circuit 36 to start the correction operation. During the execution of this first correction operation, the image information of a second image file is read to the image information memory 32, and concurrently the blurring information is read to the blurring information memory 33b2 through the switch 33a. Then, as shown in FIG. 22B, the second blurring information is calculated. In this way, the conversion from the blurring information to the image restoration filter and the correction operation on the image information are executed in parallel for the second and subsequent image files.

Here, a comparison is made between the correction times T required by the blur correction devices in Example 1 and Example 2 to perform the collective image information correction operations. Since Example 1 and Example 2 takes the same length of time to display the images of image files or to execute other related operations, the time $t_1$ for generating the image restoration filter and the time $t_2$ for processing the image information for correction are compared with each other.

As shown in FIG. 9E, the blur correction device 30 in Example 1 processes the image restoration filter calculation and the image information correction in time series. Accordingly, the correction time t for a single image dataset is the sum of the time $t_1$ for generating the image restoration filter from the blurring information, and the time $t_2$ for processing the image dataset for correction. Thus, the time T entirely required by the collective image information correction operation is calculated as (the total sum of $t_1$)+(the total sum of $t_2$).

In contrast, the blur correction device 30a in Example 2 is capable of processing the image restoration filter calculation and the image information correction in parallel. Accordingly, the correction time T required to process all image information pieces for correction is the sum of the time $t_1$ for generating the first image restoration filter, and the total sum of times $t_2$ for processing all the image information pieces for correction. Thus, the time T entirely required by the collective image information correction operation is calculated as (the time $t_1$)+(the total sum of $t_2$). The blur correction device 30a is capable of processing the collective image information correction operation more quickly than the blur correction device 30 in Example 1 by a length of time $t_1$ for generating the image restoration filters of (the number of image information pieces to be corrected −1).

Thus, a configuration needed to implement the foregoing parallel processing is built only by the additional provision of the blurring information memories 33b1 to 33bn, the image restoration filter memories 35b1 to 35bn and the switches 33a and 35a, as shown in FIG. 22A. Consequently, the blur correction device 30a and an electronic apparatus including the blur correction device 30a can be prevented from unnecessarily growing in size even when being provided with the configuration for the parallel processing.

An electronic apparatus can be provided with multiple blur correction devices 30 as shown in FIG. 9A to achieve the parallel processing most easily, but, in this case, the electronic apparatus has a very large size due to the necessity to include multiple image information memories 32 each having a large memory capacity, and multiple image information correction circuits 36 each having a large circuit scale. In contrast, the blur correction device 30a in Example 2 can have the configuration needed for the parallel processing only by additionally including the blurring information memories 33b1 to 33bn and the image restoration filter memories 35b1 to 35bn each having a small memory capacity. Hence, with the blur correction device 30a in Example 2, an increase of the circuit scale can be minimized.

Figure 23:
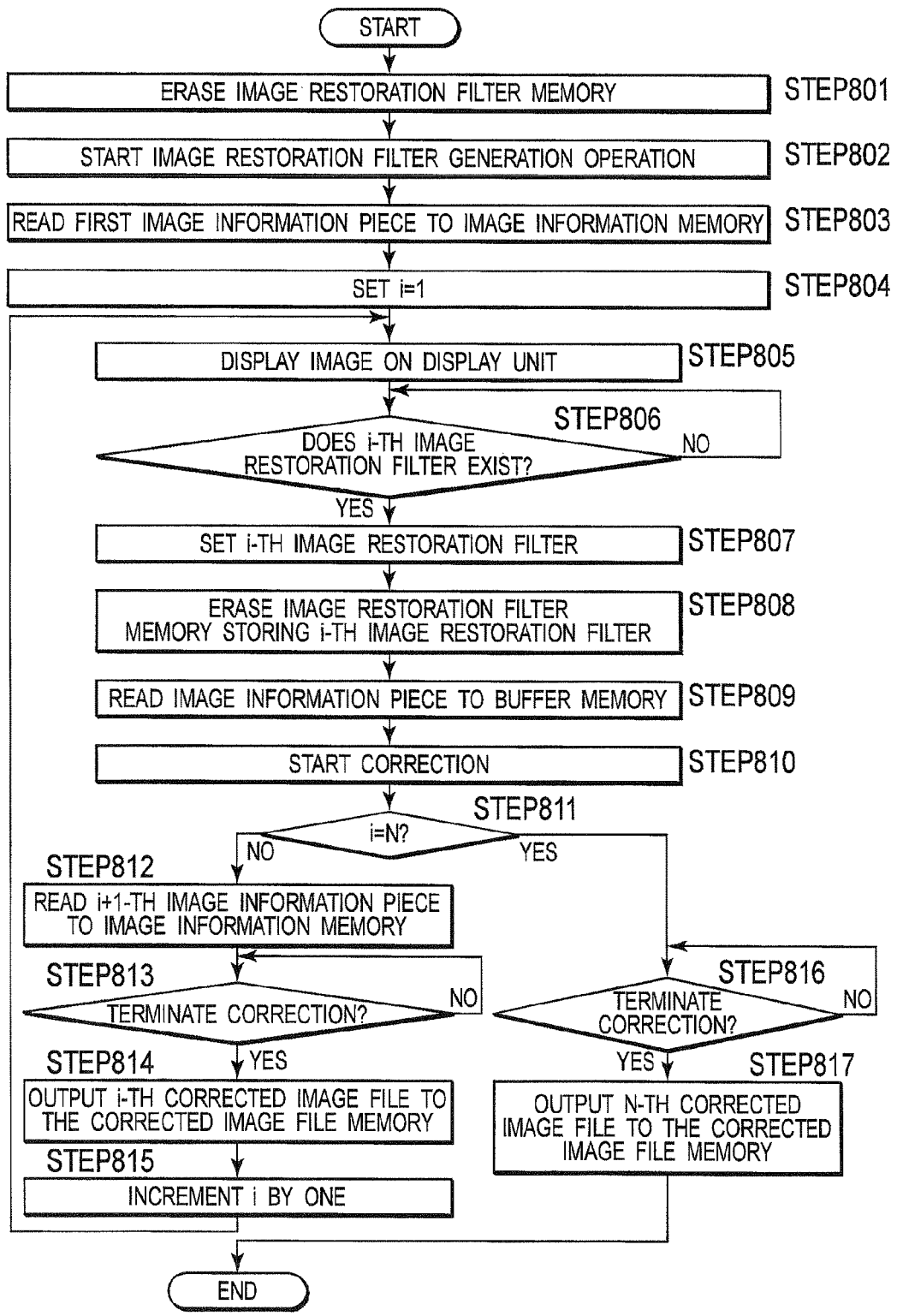
FIG. 23 is a flowchart showing an image correction operation in the collective image information correction.
Figure 24:
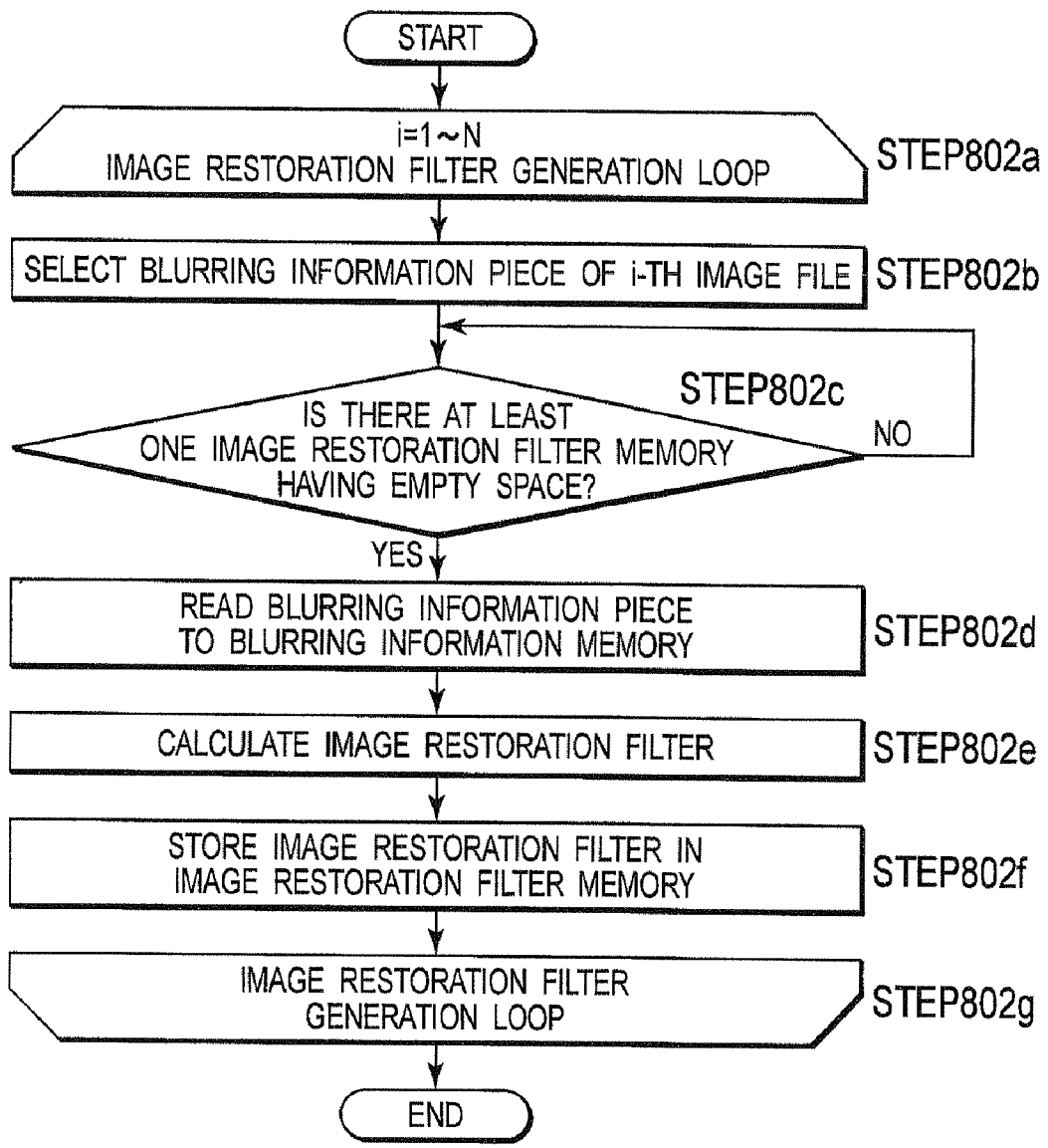
FIG. 24 is a flowchart showing an image restoration filter generation operation in the collective image information correction.

Hereinafter, specific operations of an image pickup apparatus including the blur correction device in Example 2 will be described by using flowcharts of FIGS. 23 and 24 in addition to FIGS. 22A and 22B. FIGS. 23 and 24 show operations after a user selects multiple image files in order to execute the collective image information correction operation, and the correction operation to correct the image information of the selected image files. In other words, FIGS. 23 and 24 show the detailed operations of "the collective image information correction" described in STEP 6 in FIG. 10 in Example 1. Here, assume that multiple image files to be corrected are already selected before the collective image information correction operation starts.

As shown in FIG. 23, upon start of the collective image information correction operation, data in all the image restoration filter memories are deleted (STEP 801) at first, and the calculation operation for the image restoration filters is started (STEP 802). As described above, the calculation operation for the image restoration filters is executed in parallel with the correction operation for the image information. FIG. 24 shows the flowchart of the calculation operation for the image restoration filters.

As shown in FIG. 24, upon start of the calculation operation for the image restoration filter, an image restoration filter generation loop operation starts first (STEPs 802a to 802g). This loop operation is performed for the image information pieces of all the image files selected to be corrected. Assuming that the total number of selected image files is N, the loop operation is terminated upon completion of the correction operation for the image information pieces of the first to N-th image files.

Upon start of the image restoration filter generation loop operation (STEP 802a), the blurring information piece of the first image file is selected at first (STEP 802b), and it is checked whether or not there is an empty space in at least one of the image restoration filter memories 35b1 to 35bn (STEP 802c). If there is no empty space in the image restoration filter memories 35b1 to 35bn (STEP 802c: NO), this checking to find an empty space is continued until one of the image restoration filter memories 35b1 to 35bn becomes empty. If at least one of the image restoration filter memories 35b1 to 35bn is empty (STEP 802c: YES), the blurring information piece is read through the switch 33a to one of the blurring information memories 33b1 to 33bn corresponding to an empty one of the image restoration filter memories 35b1 to 35bn (STEP 802d).

The blurring information piece read in STEP 802d is read to the blurring information computational circuit 34, and the calculation to generate the image restoration filter is performed (STEP 802e). Thereafter, the generated image restoration filter is temporarily stored in the empty one of the image restoration filter memories 35b1 to 35bn (STEP 802f) and concurrently it is determined whether to terminate the loop operation (STEP 802g).

If the correction operation has not been performed yet for the blurring information piece of the N-th image file in STEP 802g, the operation returns to STEP 802a to continue the loop operation. Then, the blurring information piece of the next image file is selected (STEP 802*b*) and the same operation as described above is performed for the selected blurring information piece. If the operation for the blurring information piece of the N-th image file has been performed, the loop operation is terminated. This image restoration filter generation operation is iteratively executed independently of the progress in the image information correction operation. However, if there are such a large number of image information pieces to be corrected and the image information correction operation is so slow, the image restoration filters yet to be used occupy the image restoration filter memories 35*b*1 to 35*bn* without leaving any empty space therein. In this case, the calculation operation for the image restoration filters is terminated as shown in STEP 802*c*.

In addition, once the foregoing calculation operation for the image restoration filters starts in STEP 802 in the collective image information correction operation in FIG. 23, the image information piece of the first image file is read to the image information memory 32 (STEP 803) to make the preparation for the image information correction. Then, the number i of the image file to be processed next is set to 1 (STEP 804), and the image of the image information piece to be corrected is displayed on the display unit 4 (STEP 805). At this time, the image is displayed in the same display manner as in Example 1. For example, several thumbnail images of image information pieces may be displayed with a marker attached to the thumbnail image of an image information piece to be corrected next, as shown in FIG. 19B, or only the image of the image information piece to be corrected may be displayed on the display unit 4 as shown in FIG. 19C. Moreover, a time required to correct all the image information pieces may be estimated and displayed, which will be described in detail later.

Then, it is checked whether or not the image restoration filter corresponding to the image information piece read to the image information memory 32 exists in one of the image restoration filter memories 35*b*1 to 35*bn* (STEP 806). If the image restoration filter does not exist (STEP 806: NO), this check is iteratively performed until the image restoration filter is generated. When it is confirmed that the image restoration filter exists (STEP 806: YES), the image restoration filter is read to and set in the image information correction circuit 36 (STEP 807), and the image restoration filter stored in one of the image restoration filter memories 35*b*1 to 35*bn* is deleted (STEP 808).

Thereafter, the image information piece is read to the buffer memory 38 (STEP 809), and the correction operation is started (STEP 810). Once the correction operation is started in STEP 810, the number of the image information currently in correct operation, i.e., the number i is checked if the number is N (STEP 811). If the number i is N (STEP 811: YES), the image information correction operation is the last one. In this case, the operation continues until the completion of the correction operation of this time (STEP 816: NO). When the completion of the correction operation is confirmed (STEP 816: YES), the i-th, i.e., N-th, in this case, corrected image file is outputted to the corrected image file memory 37 (STEP 817), and then the collective image information correction operation is terminated.

On the other hand, if the number i is not N (STEP 811: NO), the correction operation must continue to be executed after the correction operation of this time. To this end, the image information to be corrected next, that is, the image information of the i+1-th image file is read to the image information memory 32 (STEP 812). Then, the operation continues until the completion of the correction operation (STEP 813: NO). When the completion of the correction operation is confirmed (STEP 813: YES), the corrected image file is outputted to the corrected image file memory 37 (STEP 814) and the number i is incremented by one (STEP 815). Hence, the next number of the image information is to be corrected subsequently.

Thereafter, the operation returns to STEP 805, the image of the image information specified in STEP 815 is displayed on the display unit 4 (STEP 805), and then the same operation as described above is performed for the image information currently specified. The correction operation is continuously executed until the correction operation for the image information of the N-th image file, and then the collective image information correction operation is terminated.

Through the execution of the collective image information correction operation in the foregoing manner, the generation of the image restoration filters and the image information correction are processed in parallel. Thus, the correction time t of the blur correction device 30*a* can be reduced from that of the blur correction device 30 in Example 1 by a length of time $t_1$ for generating the image restoration filters of (the number of image information pieces to be corrected −1). Moreover, after the image information pieces to be corrected at this time are read to the buffer memory 38, the image information piece to be corrected next is read to the image information memory 32. Thus, the image information pieces can be continuously read to the buffer memory 38 and the image information correction circuit 36.

In addition, the blur correction device 30*a* can also use the aforementioned motion vector, the PSF, or the image restoration filter as the blurring information piece, but shows higher effect by using the motion vector as the blurring information piece than otherwise because the time reducible in Example 2 is related to the time $t_1$ for generating the image restoration filters. When the motion vector is used as the blurring information piece, the blurring information piece can be generated without needing a large increase in a time for picking up an image and generating its image file. Additionally, the information amount can be reduced as compared with the case where the image file is generated by additionally including the camera shake signal without the blurring information piece generated.

When the blur correction device 30*a* is configured to erase one of the image restoration filter memories 35*b*1 to 35*bn* immediately after reading the image restoration filter from the one of the image restoration filter memories 35*b*1 to 35*bn*, and to receive the next blurring information piece and image restoration filter, the blur correction device 30*a* can be built in a configuration additionally provided with only the minimum necessary number of the blurring information memories 33*b*1 to 33*bn* and the minimum necessary number of the image restoration filter memories 35*b*1 to 35*bn*. In addition, since the time for correcting the image information piece is approximately twice longer than the time for generating the image restoration filer, the provision of too many sets of blurring information memories 33*b*1 to 33*bn* and image restoration filter memories 35*b*1 to 35*bn* only results in that the generated image restoration filters are kept waiting. For this reason, only several sets of the blurring information memories 33*b*1 to 33*bn* and image restoration filter memories 35*b*1 to 35*bn* are sufficient, and the blur correction device 30*a* may be configured with such several sets.

Incidentally, in STEPs 801 and 808 in FIG. 23, the blurring information memories 33*b*1 to 33*bn* may be erased at the same time as that of the erasing of the corresponding image restoration filter memories 35*b*1 to 35*bn*. Instead, the blurring information memories 33*b*1 to 33*bn* may be erased when the corresponding blurring information piece is read to the blurring information computational circuit 34 in STEP 802*e* in FIG. 24. Moreover, after the blurring information memories 33b1 to 33bn are erased in STEP 802, the blurring information piece of the next image file may be read to the blurring information memories 33b1 to 33bn. Alternatively, the blur correction device 30a may identify an empty one of the blurring information memories 33b1 to 33bn in STEP 802c, and then read the blurring information piece to the empty one of the blurring information memories 33b1 to 33bn in STEP 802d.

Moreover, in the flowchart shown in FIG. 24, after the image restoration filter is stored in one of the image restoration filter memories (STEP 802f), the blurring information piece of the next image file is read to the one of the blurring information memories 33b1 to 33bn. However, the blurring information piece may be read to the one of the blurring information memories 33b1 to 33bn immediately after the one of the blurring information memories 33b1 to 33bn becomes empty when the blurring information piece is read to the information computational circuit 34. In this case, as described above, the blur correction device 30a is configured to erase the one of the blurring information memories 33b1 to 33bn once the blurring information piece is read to the blurring information computational circuit 34 from the one of the blurring information memories 33b1 to 33b11 as described above. In this configuration, the blurring information pieces are sequentially read to the blurring information memories 33b1 to 33bn and kept waiting. Hence, the image restoration filters can be generated quickly. This can reduce the number of the blurring information memories 33b1 to 33bn and image restoration filter memories 35b1 to 35bn to be additionally provided.

In order to additionally provide such memories, the number of physical memories may be increased or the number of virtual memories may be increased with a single physical memory partitioned into the virtual memories. In the latter case, the single memory stores multiple pieces of information, but too much load is not imposed on the memory because each piece of the information has only a small amount of data such as the motion vector or the image restoration filter.

Heretofore, in Example 2, the descriptions have been provided for the case where the collective image information correction is applied to the blur correction device employing the image restoration-based correction method. However, as similar to Example 1, the collective image information correction in Example 2 can be applied to a blur correction device using the electronic correction method that is capable of analyzing and correcting image information pieces after shooting as described in the case with the image restoration-based correction method.

In the case where the collective image information correction method of Example 2 is applied to the blur correction device using the electronic correction method, image information pieces after the shooting are analyzed to obtain the blurring amounts, and blurring information pieces like the above are obtained from the blurring amounts. Then, the processing for generating the image restoration filters from the blurring information pieces and the processing for correcting the image information pieces are executed in parallel. With this configuration, the blur correction device using the electronic correction method can achieve the correction operation at higher speed. Moreover, an image pickup apparatus including the blur correction device using the electronic correction method does not need a sensor and the like such as an angular velocity sensor, so that the image pickup apparatus can be downsized more.

The blur correction device in Example 2 may be configured to perform the operation other than the collective image information correction operation in the same manner as that in Example 1. For example, the blur correction device in Example 2 may perform the initial image display shown in FIG. 11 in Example 1, and may perform the general operations shown in FIGS. 13 to 17. Additionally, the blur correction device in Example 2 may select original image files to be processed in the collective image information correction operation in the same manner as that according to the blurring amount as shown in FIG. 18, or may allow a user to check corrected images after the collective image information correction operation as shown in FIG. 21.

The collective image information correction in Example 1 can be combined with the collective image information correction in Example 2. In other words, the blur correction device in Example 2 may estimate the correction time and check the battery power when performing the collective image information correction as similar to the blur correction device in Example 1. However, the collective image information correction operations in Example 1 and Example 2 are different in terms of timings at which the image restoration filters are generated. Thus, the methods of estimating the correction time and the battery power need to be adapted to the application in Example 2. Hereinafter, the details will be described with reference to FIGS. 25 and 26.

Figure 25:
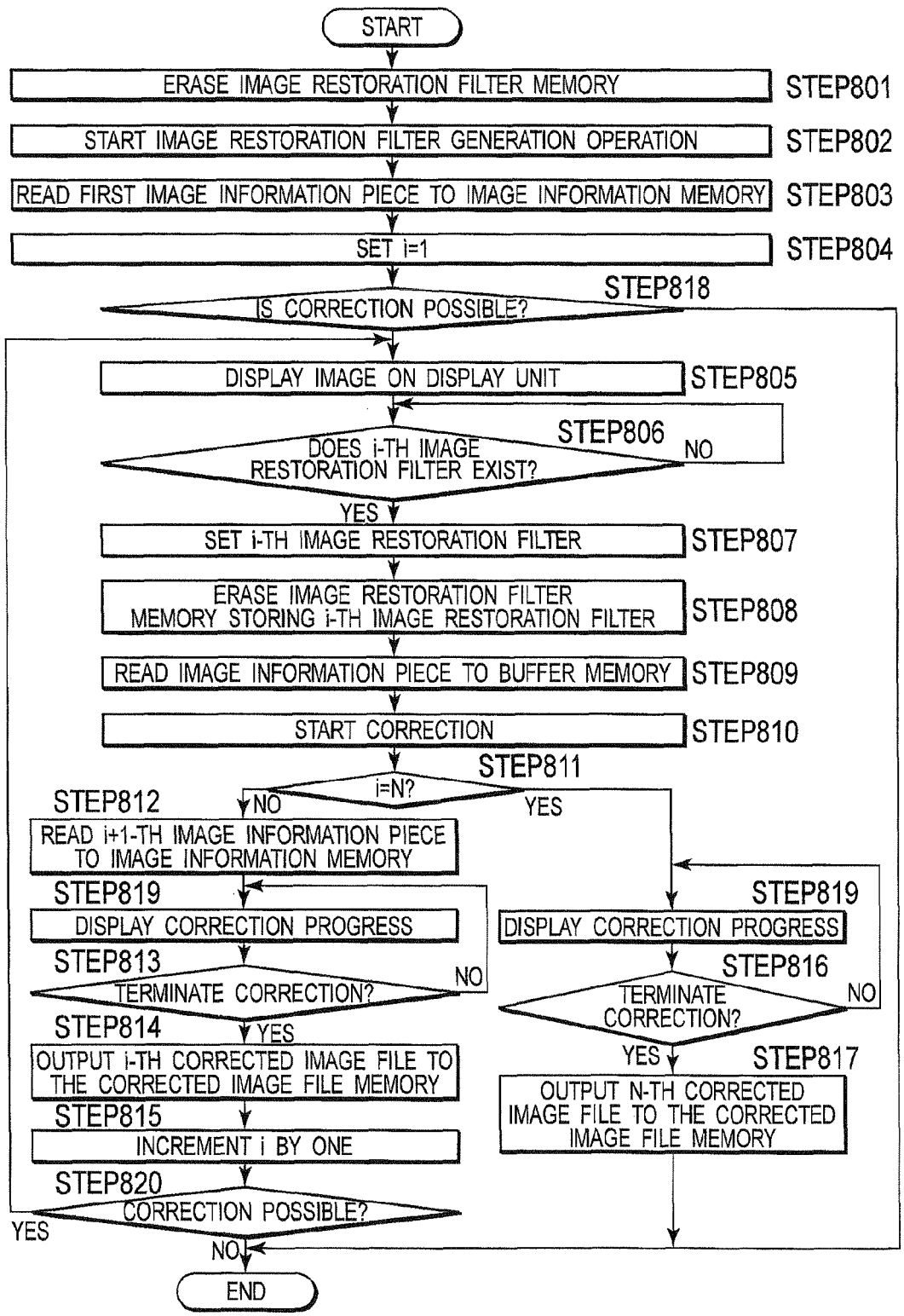
FIG. 25 is a flowchart showing an image correction operation in the collective image information correction.
Figure 26:
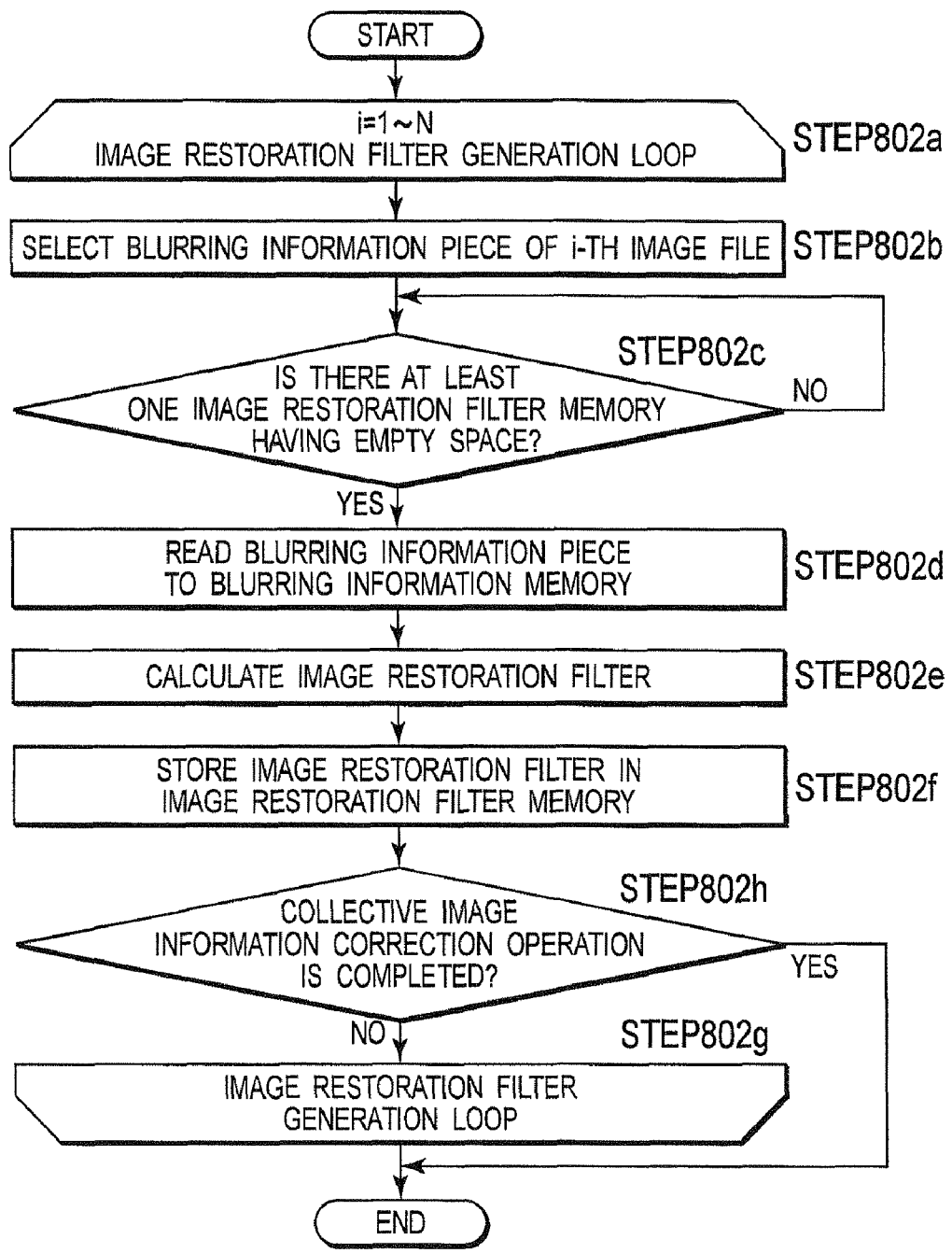
FIG. 26 is a flowchart showing an image restoration filter generation operation in the collective image information correction.

FIGS. 25 and 26 show flowcharts indicating a collective image information correction operation based on Example 2 in combination with Example 1, and respectively correspond to FIGS. 23 and 24 showing the operation in Example 2. In FIGS. 25 and 26, the same reference numerals are given to the same operation steps as those in FIGS. 23 and 24, and the detailed descriptions thereof are omitted here.

As shown in FIG. 25, the same operation (STEPs 801 to 804) as that in Example 2 is performed after the collective image information correction operation starts, until the image information piece of an image file to be corrected is read to the image information memory 32 and has the number i set to 1. After that, it is checked whether or not the correction is possible (STEP 818).

This check as to whether the correction is possible in STEP 818 is made in the same manner as that in STEPs 606 to 611 in FIG. 20 described in Example 1. In other words, the correction is determined as possible (STEP 818: YES), in the case where the battery consumption X is lower than the battery power Y in STEP 609 (STEP 609: NO) and in the case where the battery consumption X is higher than the battery power Y (STEP 609: YES) and where the correction is determined to be executed (STEP 611: YES). Then, if the correction is determined as possible, the image of the image information piece and the correction time T are displayed on the display unit 4 as in STEP 805 in FIG. 23, and thereafter the same operation as that in Example 2 is performed until the start of the correction operation of STEP 810.

Instead, the correction is determined as impossible (STEP 818: NO) in the case where the battery consumption X is higher than the battery power Y in STEP 609 (STEP 609: YES) and where the correction is determined not to be executed (STEP 611: NO). In this case, the operation is terminated without performing the collective image information correction.

Here, in Example 1, the correction time t for the image information piece of a single image file is first estimated as the sum of the time $t_1$ for generating an image restoration filter from the blurring information piece, and the time $t_2$ for performing the correction processing on the image information piece, and then the total correction time T is estimated as the total sum of all the correction times t. However, in Example 2, the generation of the image restoration filters and the image information correction processing are executed in parallel. For this reason, as described above, the total correction time $T_a$ is the sum of the times $t_2$ for performing the correction processing on all the image information pieces and the time $t_1$ for generating the image restoration filter for the first image file. This total correction time $T_a$ may be displayed on the display unit 4 in STEP 805.

Meanwhile, the battery consumption $X_a$ in STEP 818 in Example 2 is approximately equal to the battery consumption X in Example 1 because the correction operation, itself, in Example 2 is the same as in Example 1 even when the correction operation is performed in parallel with the filter generation operation. However, the total correction time $T_a$ is shorter than the total correction time T in Example 1, and thus the power consumption and the like are reduced according to the reduction in the correction time. For example, the reduction of the power consumption includes a reduction in the power consumption in the display unit in the correction operation. Accordingly, the battery consumption $X_a$ is equal to E×(the sum of $t_1$ of all the image information pieces)+F×(the sum of $t_2$ of all the image information pieces)+G×(the total correction time $T_a$). Note that the power consumption may be calculated, including the power consumption additionally needed to build the configuration of Example 2 (for example, the power used in the memories, and the power used in the switches). Moreover, (the sum of t_of all the image information pieces) may be regarded as ($t_1$×the number of image information pieces to be corrected) letting $t_1$ be a constant.

Then, the correction operation starts in STEP 810. If the correction is not for the N-th image information piece (STEP 811: NO), the next image information piece is read to the image information memory (STEP 812). Thereafter, the correction progress is displayed in the same manner as in Example 1 (STEP 819). This operation is the same as STEP 622 in FIG. 20. For example, the correction progress is displayed as shown in FIG. 19D. At this time point, the image restoration filter corresponding to the first image information piece has been generated, the remaining correction time T1 is equal to only the sum of the times $t_2$ for performing the correction processing on the i-th and subsequent image information pieces. Similarly, in the case of correcting the image information of the N-th image file (STEP 811: YES), the correction progress is also displayed (STEP 819).

Then, upon completion of the correction (STEP 813: YES), the corrected image file is outputted (STEP 814). Then, when the correction starts for the next image information piece (STEP 815), it is determined whether or not the correction is possible (STEP 820). This operation is the same as STEPs 618 and 619 in FIG. 20 in Example 1. Specifically, the correction is determined as possible (STEP 820: YES), in the case where the battery consumption $X_i$ is lower than the battery power $Y_i$ in STEP 618 (STEP 618: NO) and in the case where the battery consumption $X_i$ is higher than the battery power $Y_i$ (STEP 618: YES) and where the battery power $Y_i$ is greater than the value TH2 (STEP 619: YES). In this case, the operation returns to STEP 805 to correct the next image information piece.

On the other hand, the correction is determined as impossible (STEP 820: NO), in the case where the battery consumption $X_i$ is higher than the battery power $Y_i$ (STEP 618: YES), and where the battery power $Y_i$ is smaller than the value TH2 (STEP 619: YES) in FIG. 20 in Example 1. In this case, the collective image information correction is terminated.

In the case of the battery consumption $X_{ia}$ is estimated in STEP 320 in Example 2, the remaining correction time $T_{ia}$ can be calculated as similar to Example 1. However, like the foregoing total correction time $T_a$, the remaining correction time $T_{ia}$ is different from that in Example 1. Here, at this time, the first to i-th image information pieces have already been corrected, the remaining image information pieces are the i-th to N-th ones. Accordingly, the battery consumption $X_{ia}$ is equal to E×(the sum of $t_1$ of the i+1-th to N-th image information pieces)+F×(the sum of $t_2$ of the i+1-th to N-th image information pieces)+G×(the remaining correction time $T_{ia}$). The remaining correction time $T_{ia}$ is equal to the sum of $t_2$ of the i+1-th to N-th image information pieces. Note that, letting $t_1$ be a constant, (the sum of $t_1$ of all the image information pieces) may be regarded as ($t_1$×the number of image information pieces to be corrected). In addition, the remaining correction time $T_{ia}$ may be displayed on the display unit in STEP 805.

On the other hand, as shown in FIG. 26, the image restoration filter generation operation in Example 2 may be combined with that in Example 1. In this case, the operation (STEPs 802a to 802f) of generating the image restoration filters and storing the filters in the image restoration filter memories is the same as in Example 2. Thereafter, it is necessary to check whether or not the collective image information correction operation has been terminated (STEP 802h). If the battery capacities $Y_a$ and $Y_{ia}$ are short in STEPs 818 and 820, respectively, in FIG. 25, the collective image information correction operation is terminated. In Example 2, however, the image restoration filter generation operation, which is executed in parallel with the image information correction operation, is not terminated in some cases at the same time when the image information correction operation is terminated. For this reason, it is checked in STEP 818 whether or not the collective image information correction operation has been terminated.

In this case, the collective image information correction operation has been terminated (STEP 802h: YES), the image restoration filter generation operation exits from the loop operation and then are terminated. Instead, when the collective image information correction operation has not been terminated (STEP 802h: NO), it is determined whether to continue the image restoration filter generation loop operation (STEP 802g).

As described above, in the case where Example 2 is combined with Example 1, the collective image information correction operation, in which the battery power is likely to be exhausted, is executed on the condition that the battery power is determined as sufficient before the correction of every image information piece. This prevents the battery power from being exhausted while one image information piece is being corrected in the collective image information correction operation. Not only does this avoid image file corruption, but also prevents the user from failing to know how many images have been corrected. In addition, the user can be warned that the battery power may be exhausted before the collective image information correction operation that needs high power consumption.

In addition, only image files to be corrected can be arranged and displayed in descending order, which can reduce a time and effort required by a user to select image files to be corrected. Additionally, the time required for the correction is estimated and displayed to the user. This can make the user get relief from stress.

Moreover, in STEP 802h, as in STEPs 818 and 820 in FIG. 25, the battery power $Y_{ia}$ may be checked to suspend the image restoration filter generation operation if the battery power $Y_{ia}$ is smaller than the value TH2. Further, the battery consumptions x and $x_i$ in Example 1 may be used as the battery consumptions $X_a$ and $X_{ia}$ estimated in STEPs 818 and 820, respectively, in FIG. 25.

Furthermore, the value TH2 that is compared with the battery power $Y_{ia}$ in STEPs 818 and 820 in FIG. 25 may be different from that in Example 1. In particular, in Example 2, the power is also consumed by the sequential generation of the image restoration filters. For this reason, if TH2 is set to a larger value, the battery power is less likely to be exhausted.

The present invention relates to: a blur correction device mounted in an electronic apparatus typified by an image pickup apparatus such as a digital camera and an image output apparatus such as a display and printer; a blur correction method thereof; and an electronic apparatus equipped with the blur correction device. Moreover, the present invention relates to an image file used in these electronic apparatuses and an image creating apparatus configured to generate the image file.

What is claimed is:

1. A blur correction device configured to obtain a plurality of image files each including an image information piece and a blurring information piece that indicates blurring contained in the image information piece, comprising:
   a correction unit configured to generate a corrected image file by correcting the image information piece on the basis of the blurring information piece;
   a rearranging unit configured to obtain the blurring amount from the blurring information piece, the blurring amount indicating intensity of the blurring, and to rearrange the plurality of image files according to the blurring amount; and
   an image file selector configured to select specific image files from among the plurality of image files rearranged by the rearranging unit, wherein
   the correction unit generates corrected image files corresponding to each of the specific image files, by correcting the image information piece on the basis of the blurring information piece, the image and blurring information pieces being included in the each of the specific image files, and wherein
   the rearranging unit places the corrected image files adjacent to corresponding specific image files.

2. The blur correction device according to claim 1, further comprising a display unit configured to display images of the plurality of image files, wherein
   the display unit displays the images of the plurality of image files in the order in which the plurality of image files are rearranged by the rearranging unit.

3. The blur correction device according to claim 1, further comprising a correction time estimation unit configured to estimate a correction time on the basis of each of blurring information pieces corresponding to each of image information pieces that need correcting but are yet to be corrected, when the correction unit sequentially corrects the image information pieces included in each of the specific image files, the correction time indicating a time required until the correction unit completes the correction operation.

4. The blur correction device according to claim 3, further comprising:
   a power supply configured to drive the blur correction device by use of electric power charged therein;
   a detector configured to detect the amount of electric power charged in the power supply;
   a correction power consumption estimation unit configured to estimate the amount of power consumption being required until the correction unit completes the correction operation, on the basis of the correction time estimated by the correction time estimation unit.

5. A blur correction device configured to obtain a plurality of image files each including an image information piece and a blurring information piece that indicates blurring contained in the image information piece, comprising:
   a correction unit configured to generate a corrected image file by correcting the image information piece on the basis of the blurring information piece;
   a rearranging unit configured to obtain the blurring amount from the blurring information piece, the blurring amount indicating intensity of the blurring, and to rearrange the plurality of image files according to the blurring amount;
   an image file selector configured to select specific image files from among the plurality of image files rearranged by the rearranging unit;
   a storage unit configured to store the specific image files and the corrected image files corresponding to each of the specific image files; and
   a controller configured to control the storage unit, wherein
   in response to an instruction to delete any one file of a pair of one specific image file included in the specific image files and one corrected image file corresponding to the one specific image file, the controller deletes both the designated file and the other file in the pair, and wherein
   the correction unit generates corrected image files corresponding to each of the specific image files, by correcting the image information piece on the basis of the blurring information piece, the image and blurring information pieces being included in the each of the specific image files.

6. An electronic apparatus configured to obtain an image information piece by receiving external input or by imaging, and to have a function of correcting the image information piece on the basis of a blurring information piece that indicates blurring contained in the image information piece, comprising
   the blur correction device according to claim 1 as a correction processor that implements the correction function, wherein
   the blur correction device corrects the image information piece to generate a corrected image file.

7. The electronic apparatus according to claim 6, further comprising:
   an imager configured to generate the image information piece by performing an image pickup operation;
   a sensor configured to detect movements of the electronic apparatus during the image pickup operation and to generate a camera shake signal;
   a blurring information generator configured to generate the blurring information piece from the camera shake signal obtained from the sensor; and
   an image file generator configured to generate the image file composed of the image information piece and the blurring information piece.

8. A blur correction device configured to obtain a plurality of image files each including an image information piece and a blurring information piece that indicates blurring contained in the image information piece, comprising:
   a correction unit configured to generate a corrected image file by correcting the image information piece on the basis of the blurring information piece;
   a correction time estimation unit configured to estimate a correction time on the basis of the blurring information piece corresponding to the image information piece, the correction time indicating a time required until the correction unit completes the correction operation for the image information piece;

a power supply configured to drive the blur correction device by use of electric power charged therein;

a detector configured to detect the amount of electric power charged in the power supply; a correction power consumption estimation unit configured to estimate the amount of power consumption being required until the correction unit completes the correction operation, on the basis of the correction time estimated by the correction time estimation unit, and wherein the corrected image file is placed adjacent to a corresponding image file.

9. An electronic apparatus configured to obtain an image information piece by receiving external input or by imaging, and to have a function of correcting the image information piece on the basis of a blurring information piece that indicates blurring contained in the image information piece, comprising the blur correction device according to claim 8 as a correction processor that implements the correction function, wherein the blur correction device corrects the image information piece to generate a corrected image file.

10. The electronic apparatus according to claim 9, further comprising:

an imager configured to generate the image information piece by performing an image pickup operation;

a sensor configured to detect movements of the electronic apparatus during the image pickup operation and to generate a camera shake signal;

a blurring information generator configured to generate the blurring information piece from the camera shake signal obtained from the sensor; and an image file generator configured to generate the image file composed of the image information piece and the blurring information piece.

11. A method for blur correction in an electronic apparatus comprising:

a first step of obtaining a plurality of image files each including an image information piece and a blurring information piece that indicates blurring contained in the image information piece, of obtaining the blurring amount from the blurring information piece, the blurring amount indicating intensity of the blurring, and of rearranging the plurality of image files according to the blurring amount;

a second step of selecting specific image files from the plurality of image files rearranged in the first step; and a third step of correcting the image information piece on the basis of the blurring information piece, the image and blurring information pieces being included in the each of the specific image files, wherein each of the corrected image file is placed adjacent to each of the corresponding specific image files.

* * * * *